United States Patent
Kodama

(10) Patent No.: US 12,289,547 B2
(45) Date of Patent: Apr. 29, 2025

(54) DYNAMIC VISION SENSOR IMAGING DEVICE

(71) Applicant: SONY SEMICONDUCTOR SOLUTIONS CORPORATION, Kanagawa (JP)

(72) Inventor: Kazutoshi Kodama, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 18/000,655

(22) PCT Filed: Jun. 4, 2021

(86) PCT No.: PCT/JP2021/021302
§ 371 (c)(1),
(2) Date: Dec. 2, 2022

(87) PCT Pub. No.: WO2021/256290
PCT Pub. Date: Dec. 23, 2021

(65) Prior Publication Data
US 2023/0224605 A1    Jul. 13, 2023

(30) Foreign Application Priority Data
Jun. 19, 2020   (JP) .................... 2020-105876

(51) Int. Cl.
*H04N 25/707* (2023.01)
*H04N 25/773* (2023.01)
*H04N 25/79* (2023.01)

(52) U.S. Cl.
CPC ......... *H04N 25/707* (2023.01); *H04N 25/773* (2023.01); *H04N 25/79* (2023.01)

(58) Field of Classification Search
CPC .... H04N 25/707; H04N 25/773; H04N 25/79; H04N 25/47; H04N 25/705;
(Continued)

(56) References Cited

U.S. PATENT DOCUMENTS

2014/0009648 A1* 1/2014 Kim ............... H04N 25/42
348/272
2014/0009650 A1* 1/2014 Kim ............... H04N 25/75
348/294
(Continued)

FOREIGN PATENT DOCUMENTS

JP   2020-053827   4/2020
JP   2020-088480   6/2020
(Continued)

OTHER PUBLICATIONS

International Search Report and Written Opinion prepared by the Japan Patent Office on Aug. 3, 2021, for International Application No. PCT/JP2021/021302, 3 pgs.

*Primary Examiner* — Albert H Cutler
(74) *Attorney, Agent, or Firm* — SHERIDAN ROSS P.C.

(57) ABSTRACT

The present disclosure provides an imaging device capable of outputting a signal other than an event detection signal, such as a pixel signal at a gradation level. The imaging device has a stacked chip structure formed by stacking at least two semiconductor chips including a first-layer semiconductor chip and a second-layer semiconductor chip. The first-layer semiconductor chip has a pixel array unit in which an event pixel that outputs an event detection signal, and a distance measurement pixel are mixed. The second-layer semiconductor chip is provided with an analog front-end unit for an event pixel that processes the event detection signal and with an analog front-end unit for a distance measurement pixel that processes the signal from the light-receiving element, corresponding to each of the event pixel and the distance measurement pixel.

20 Claims, 23 Drawing Sheets

(58) Field of Classification Search
CPC .. H04N 25/703; H04N 25/706; H04N 25/708; H04N 25/702; G01S 17/894; G01S 7/4865; H01L 27/14618; H01L 27/14634; H01L 31/107
See application file for complete search history.

(56) References Cited

U.S. PATENT DOCUMENTS

| | | | | |
|---|---|---|---|---|
| 2018/0152644 | A1* | 5/2018 | Kondo | H01L 27/14643 |
| 2018/0348381 | A1* | 12/2018 | Nishihara | G01T 1/2006 |
| 2019/0288024 | A1* | 9/2019 | Berner | H04N 25/77 |
| 2019/0302240 | A1* | 10/2019 | Webster | G01S 17/894 |

FOREIGN PATENT DOCUMENTS

| | | |
|---|---|---|
| JP | 2020-088722 | 6/2020 |
| JP | 2020-096347 | 6/2020 |
| WO | WO 2019/087471 | 5/2019 |

* cited by examiner

FIG. 18
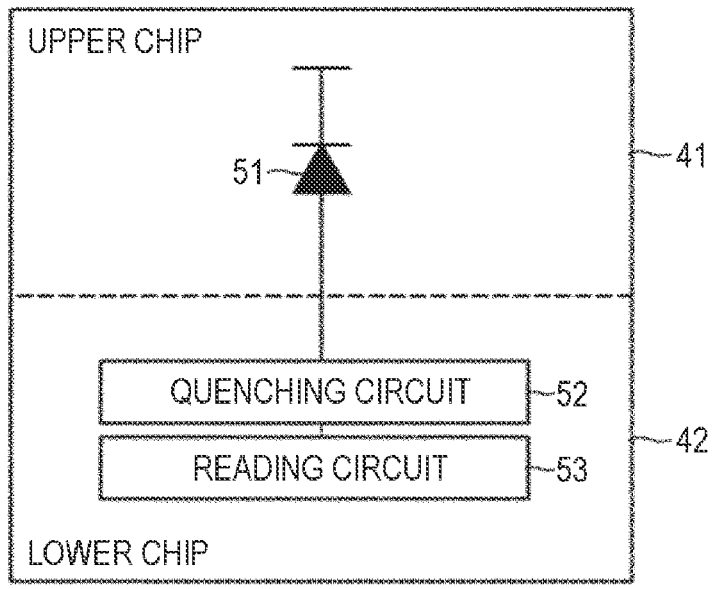
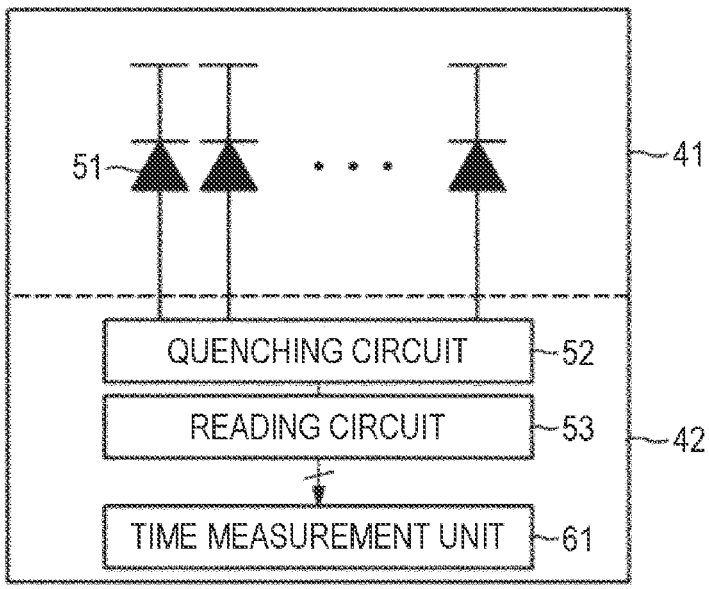

FIG. 21
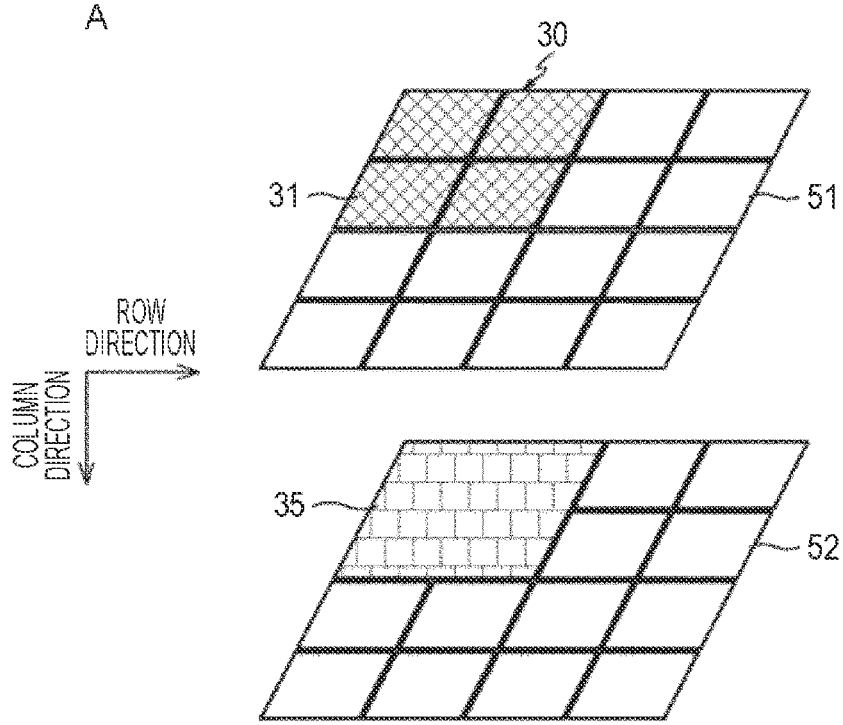
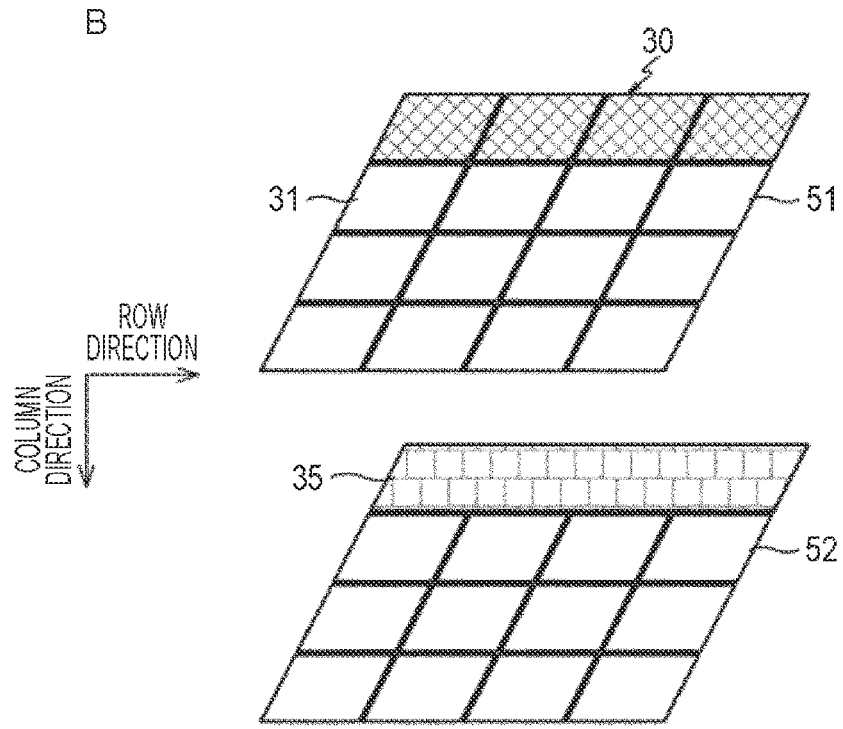

DYNAMIC VISION SENSOR IMAGING DEVICE

CROSS REFERENCE TO RELATED APPLICATIONS

This application is a national stage application under 35 U.S.C. 371 and claims the benefit of PCT Application No. PCT/JP2021/021302, having an international filing date of Jun. 4, 2021, which designated the United States, which PCT application claimed the benefit of Japanese Patent Application No. 2020-105876, filed 19-6-2020, the entire disclosures of each of which are incorporated herein by reference.

TECHNICAL FIELD

The present disclosure relates to an imaging device.

BACKGROUND ART

There is a non-scanning type (asynchronous-type) imaging device called a dynamic vision sensor (DVS) as opposed to a scanning-type (synchronous-type) imaging device that performs imaging in synchronization with a synchronization signal such as a vertical synchronization signal (refer to Patent Document 1, for example). The non-scanning type imaging device detects a phenomenon in which an amount of change in luminance of a pixel, which photoelectrically converts incident light, exceeds a predetermined threshold value as event occurrence, and outputs an event detection signal.

CITATION LIST

Patent Document

Patent Document 1: WO 2019/087471 A1

SUMMARY OF THE INVENTION

Problems to be Solved by the Invention

A non-scanning type (asynchronous-type) imaging device called DVS is desired not only to be able to detect a motion of a subject (moving object) by detecting event occurrence, but also to be able to output a signal other than an event detection signal, such as a pixel signal at a gradation level according to an amount of incident light.

An object of the present disclosure is to provide an imaging device capable of outputting a signal other than an event detection signal, such as a pixel signal at a gradation level according to an amount of incident light, in addition to an event detection signal indicating event occurrence.

Solutions to Problems

An imaging device of the present disclosure for achieving the above object
includes a stacked chip structure formed by stacking at least two semiconductor chips including a first-layer semiconductor chip and a second-layer semiconductor chip,
in which the first-layer semiconductor chip is provided with a pixel array unit in which an event pixel that detects a phenomenon in which an amount of change in luminance of a pixel exceeds a predetermined threshold value as event occurrence and outputs an event detection signal, and a gradation pixel that outputs a pixel signal at a gradation level according to an amount of incident light are mixed, and
the second-layer semiconductor chip is provided with an analog front-end unit for an event pixel that processes the event detection signal and with an analog front-end unit for a gradation pixel that processes the pixel signal, corresponding to each of the event pixel and the gradation pixel.

An imaging device of the present disclosure for achieving the above object
includes a stacked chip structure formed by stacking at least two semiconductor chips including a first-layer semiconductor chip and a second-layer semiconductor chip,
in which the first-layer semiconductor chip is provided with a pixel array unit in which an event pixel that detects a phenomenon in which an amount of change in luminance of a pixel exceeds a predetermined threshold value as event occurrence and outputs an event detection signal, and a distance measurement pixel including a light-receiving element that receives, from a target of distance measurement, reflected light based on irradiation light from a light source unit and generates a signal in response to reception of a photon are mixed, and
the second-layer semiconductor chip is provided with an analog front-end unit for an event pixel that processes the event detection signal and with an analog front-end unit for a distance measurement pixel that processes the signal from the light-receiving element, corresponding to each of the event pixel and the distance measurement pixel.

Figure 2:
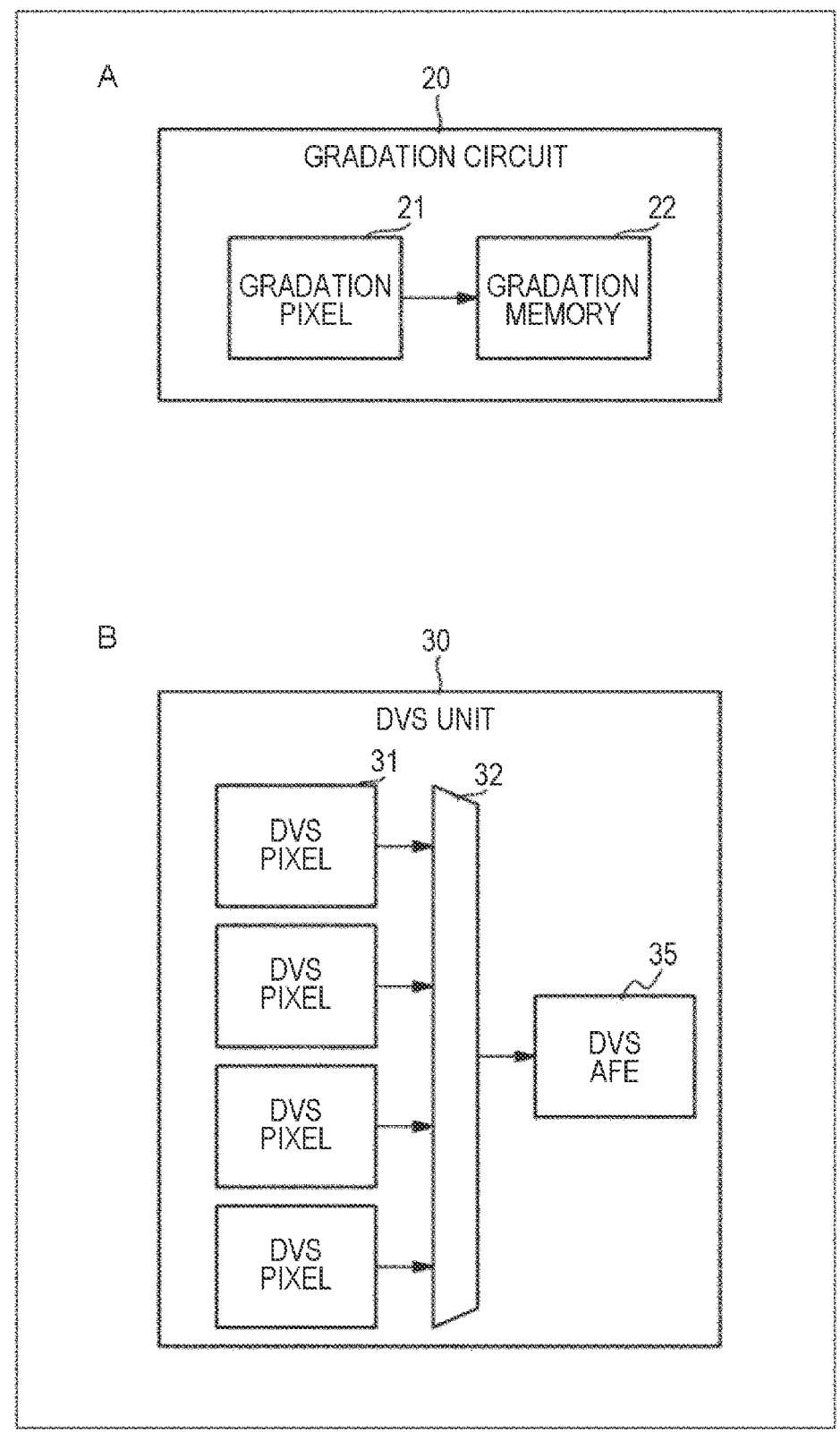

A of FIG. 2 is a block diagram illustrating an example of a configuration of a gradation circuit, and B of FIG. 2 is a block diagram illustrating an example of a configuration of a DVS unit.

Figure 3:
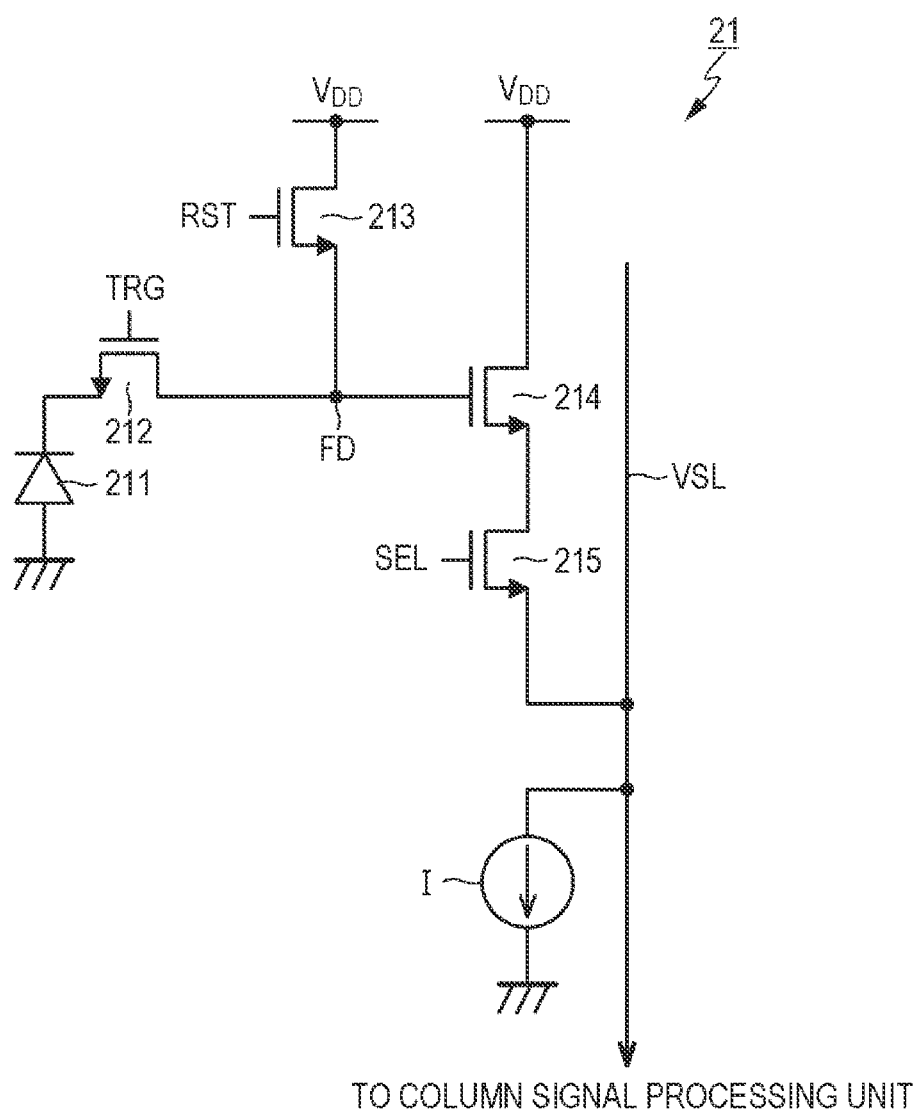

FIG. 3 is a circuit diagram illustrating a specific example of a configuration of a gradation pixel.

Figure 4:
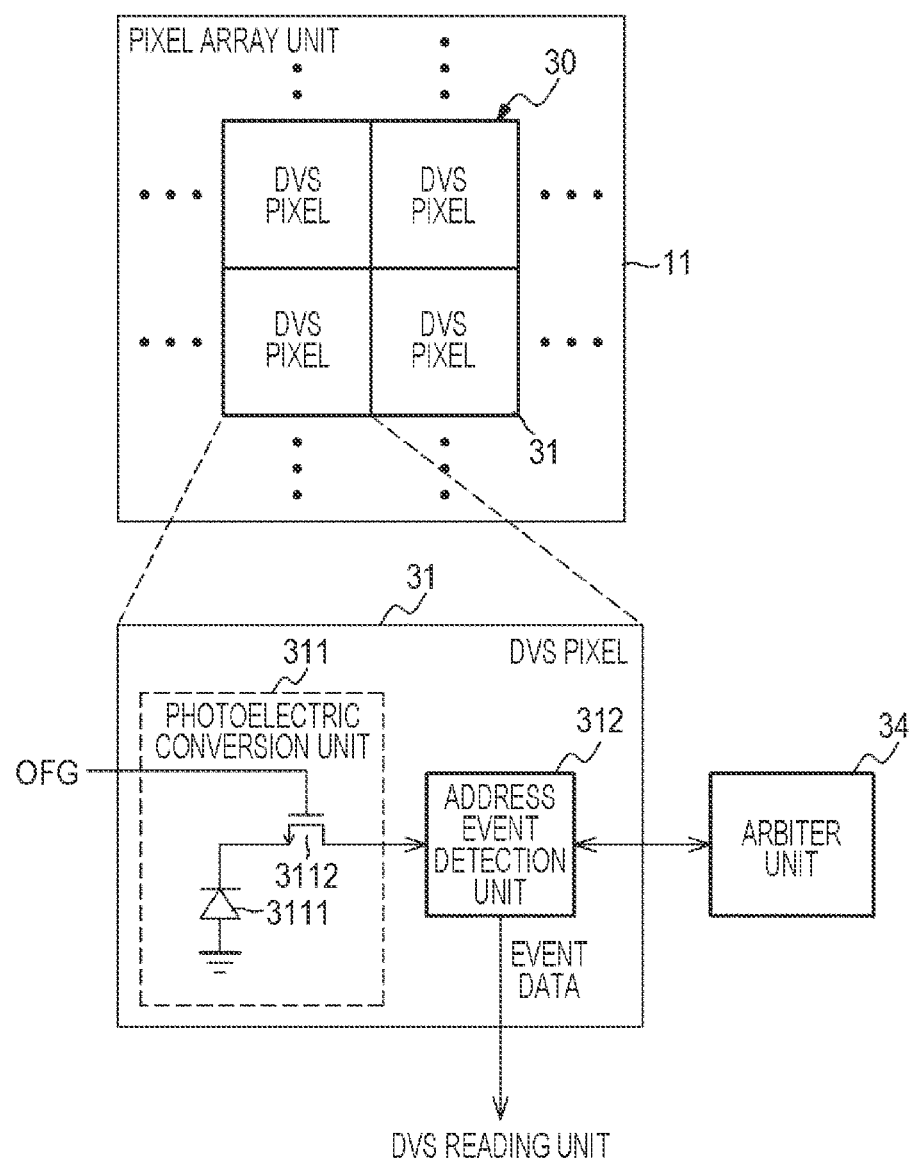

FIG. 4 is a circuit diagram illustrating a specific example of a configuration of a DVS pixel.

Figure 5:
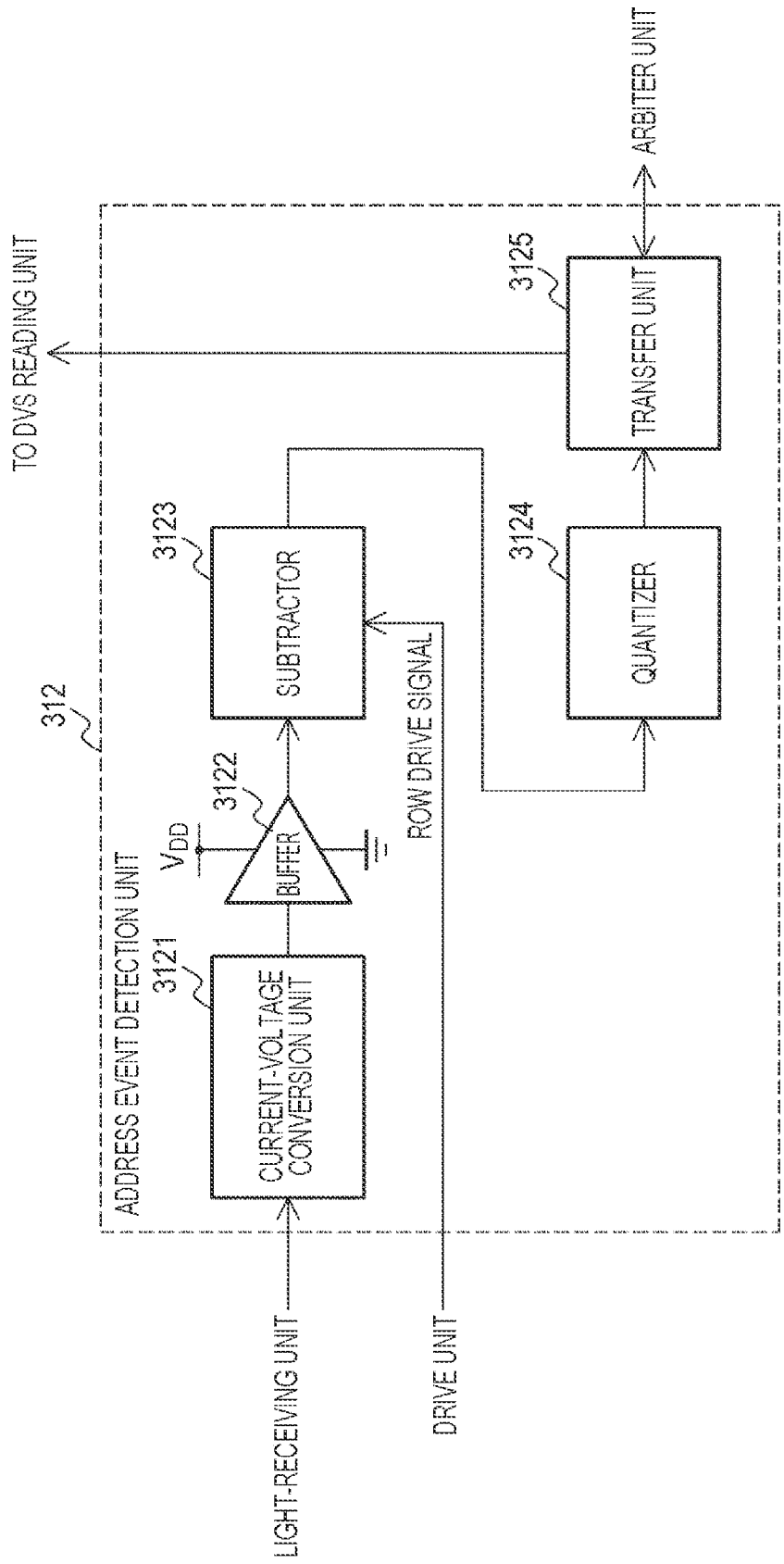

FIG. 5 is a block diagram illustrating an example of a configuration of an address event detection unit.

Figure 6:
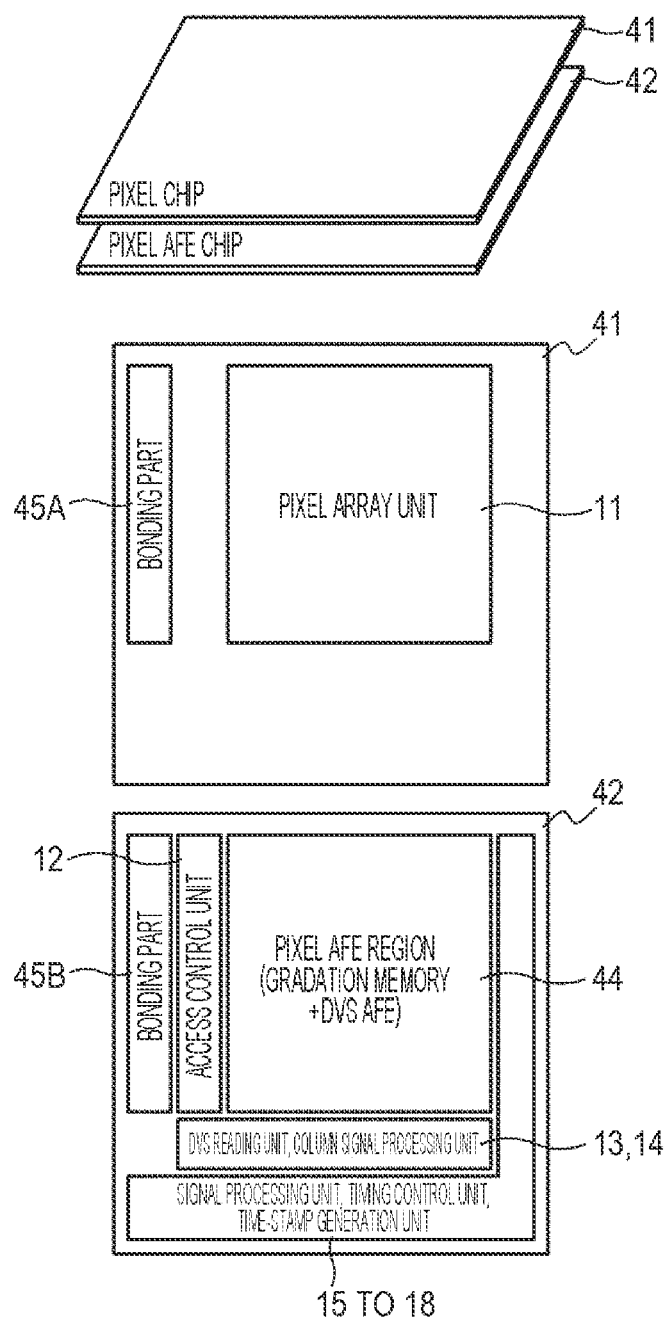

FIG. 6 is a schematic diagram illustrating a stacked chip structure according to a first specific example in the imaging device according to the first embodiment of the present disclosure.

Figure 7:
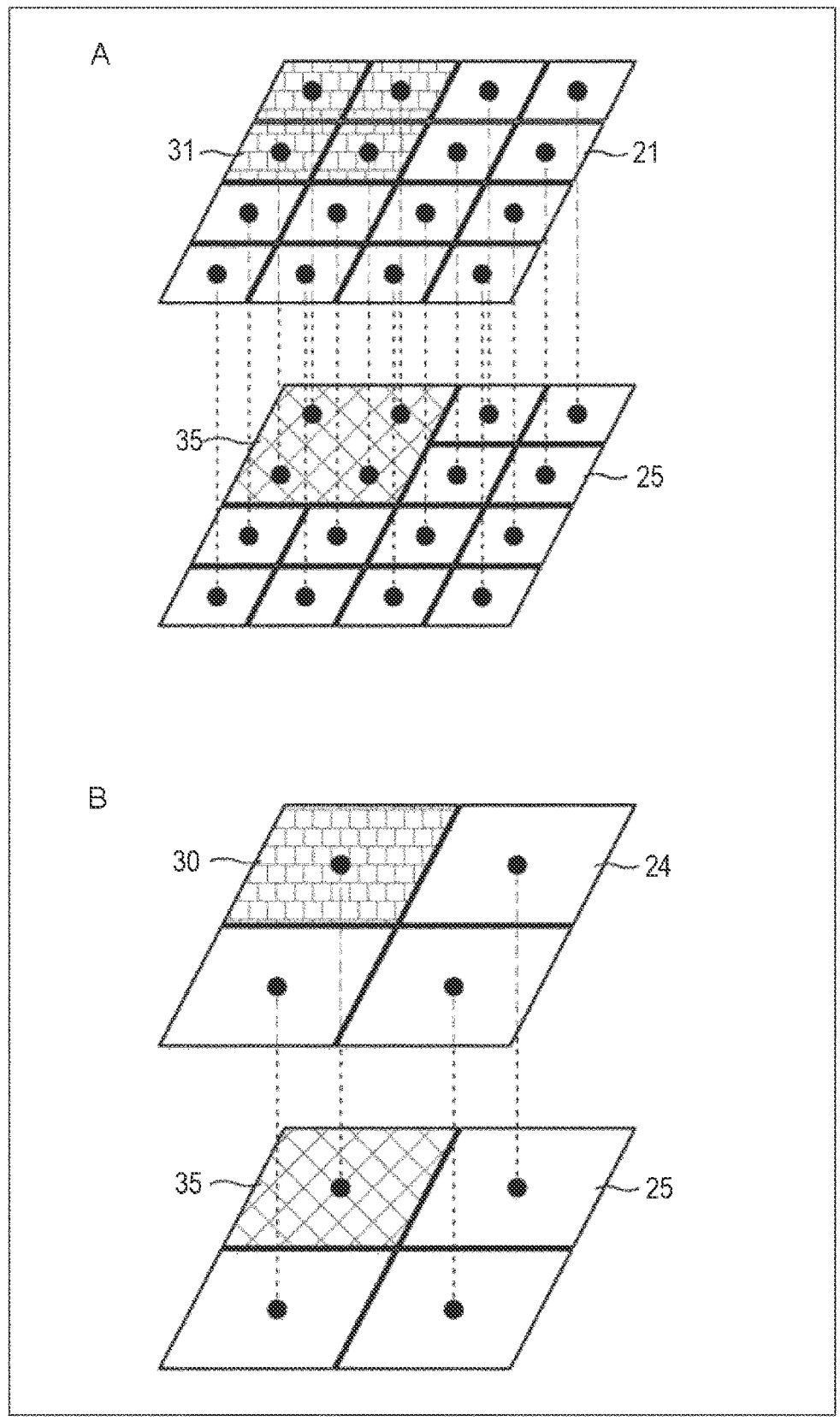

A of FIG. 7 is a diagram illustrating a correspondence 1 between gradation pixels and DVS pixels of a first-layer semiconductor chip, and respective analog front-end units of a second-layer semiconductor chip, and B of FIG. 7 is a diagram illustrating a correspondence 2 between the gradation pixels and DVS pixels of the first-layer semiconductor chip, and respective analog front-end units of the second-layer semiconductor chip.

Figure 8:
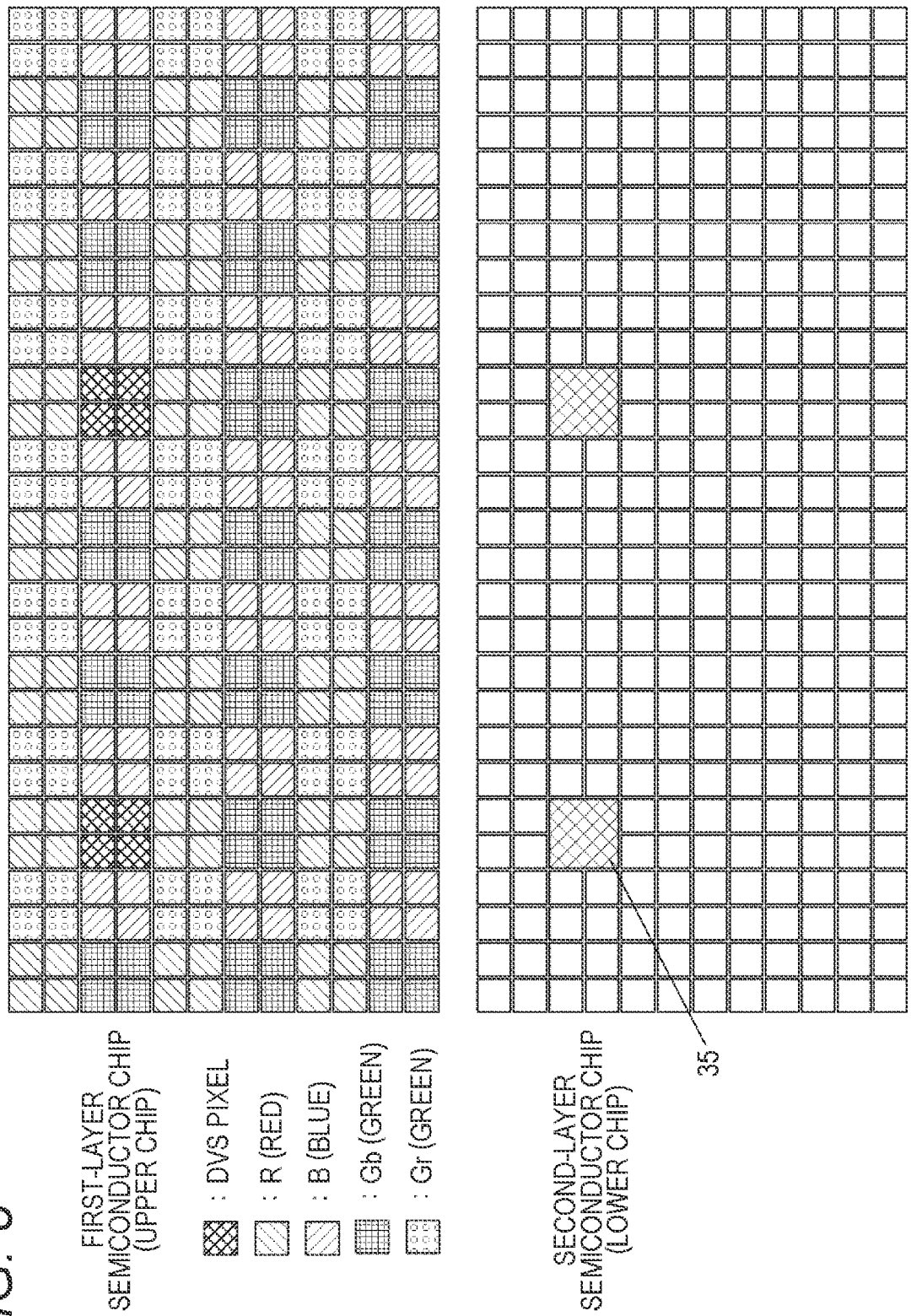

FIG. 8 is an image diagram illustrating a pixel array of the gradation pixels and the DVS pixels.

Figure 9:
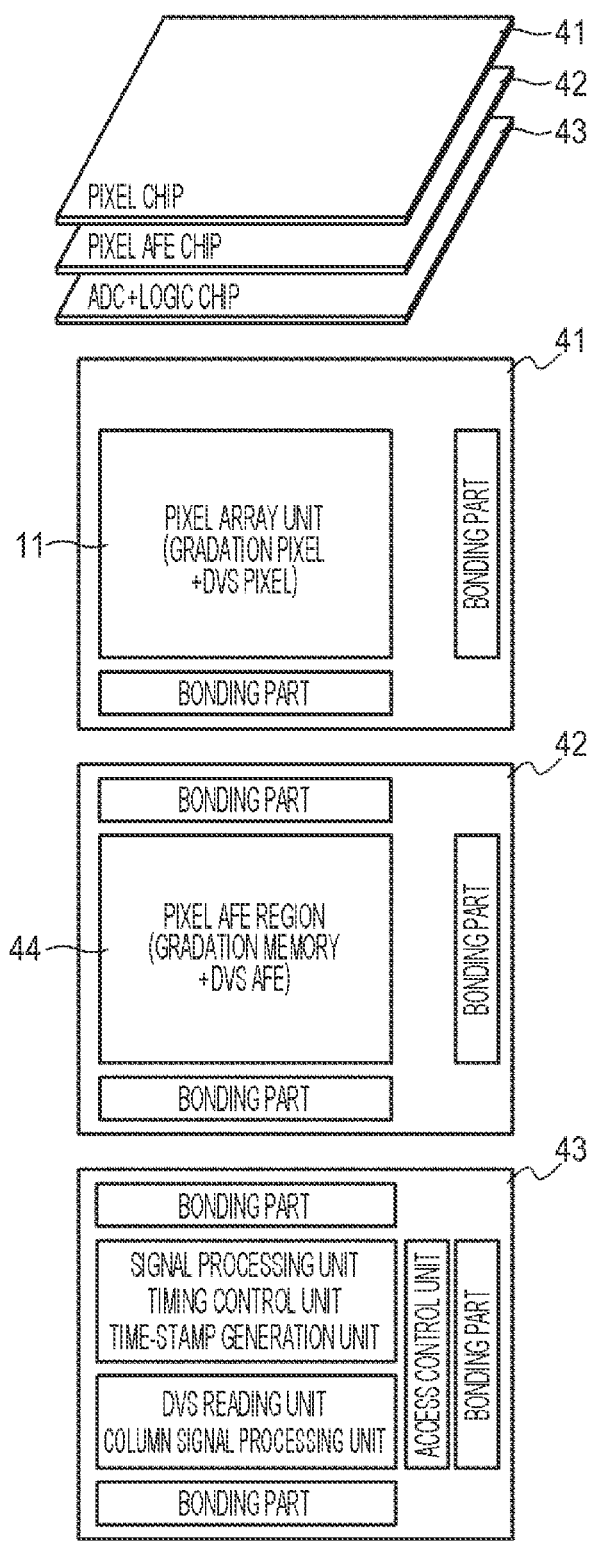

FIG. 9 is a schematic diagram illustrating a stacked chip structure according to a second specific example in the imaging device according to the first embodiment of the present disclosure.

Figure 10:
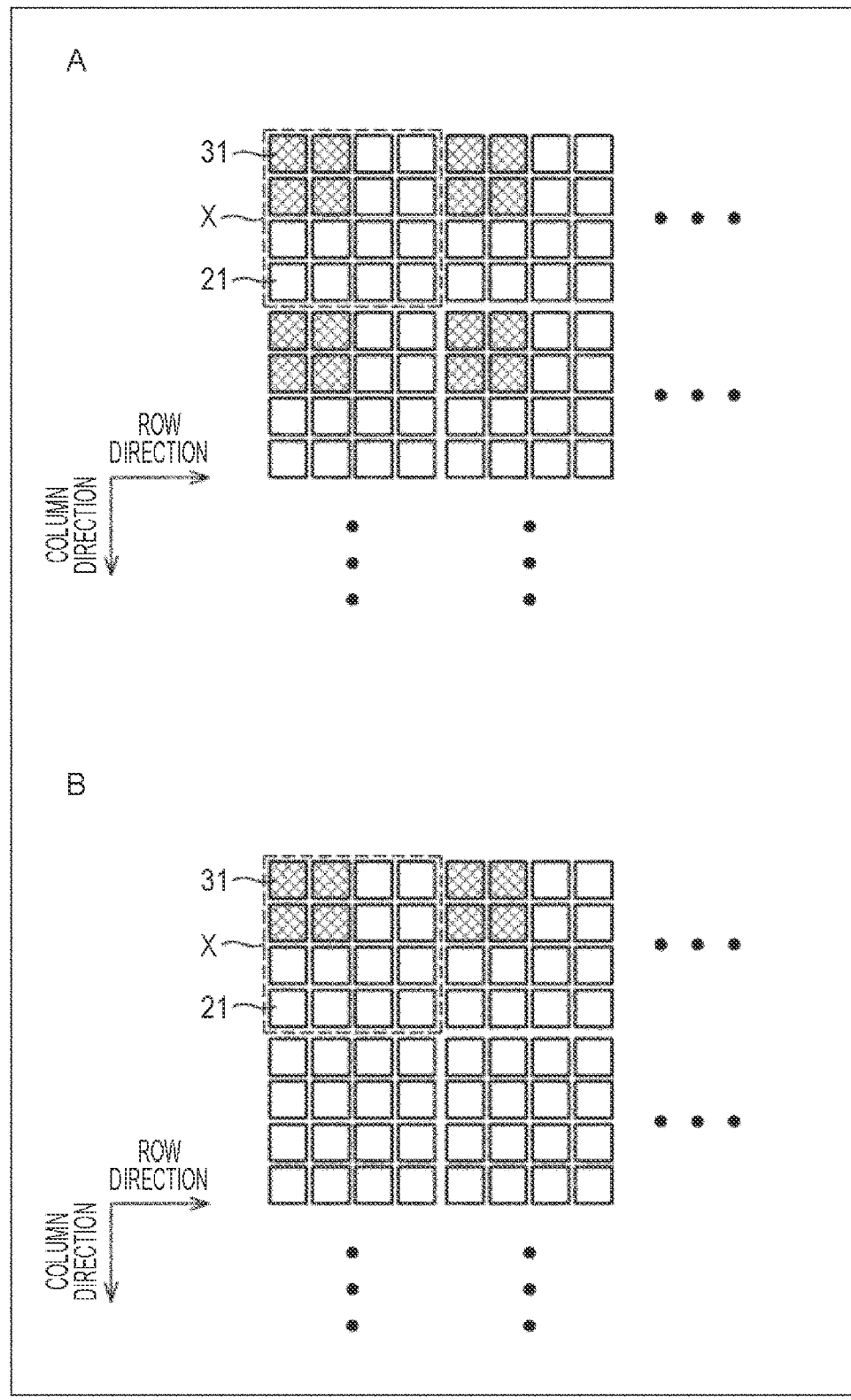

A of FIG. 10 is a diagram illustrating a pixel arrangement according to a first configuration example in the imaging device according to the first embodiment of the present disclosure, and B of FIG. 10 is a diagram illustrating the pixel arrangement according to a second configuration example in the imaging device according to the first embodiment of the present disclosure.

Figure 11:
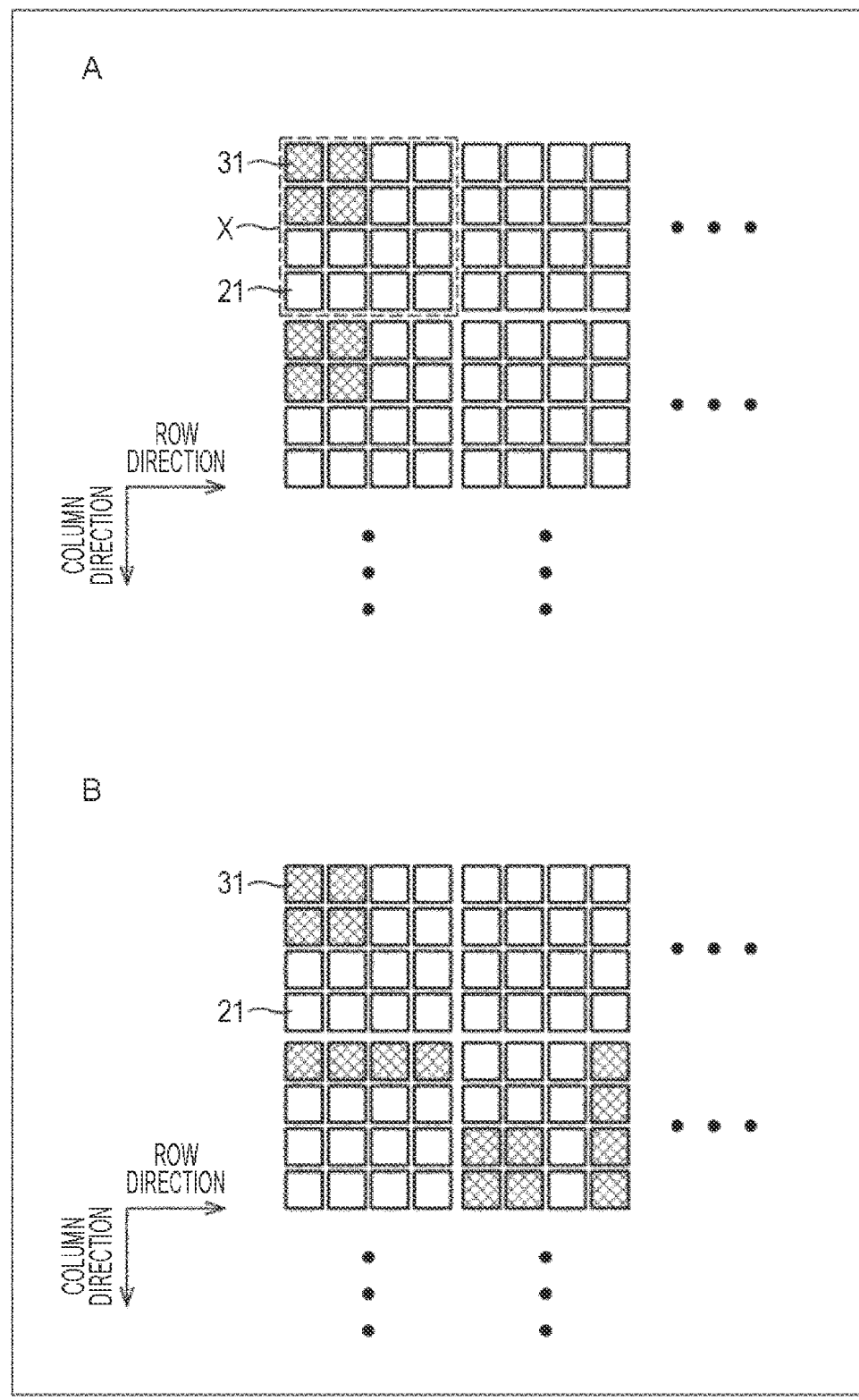

A of FIG. 11 is a diagram illustrating a pixel arrangement according to a third configuration example in the imaging device according to the first embodiment of the present disclosure, and B of FIG. 11 is a diagram illustrating a pixel arrangement according to a fourth configuration example in the imaging device according to the first embodiment of the present disclosure.

Figure 12:
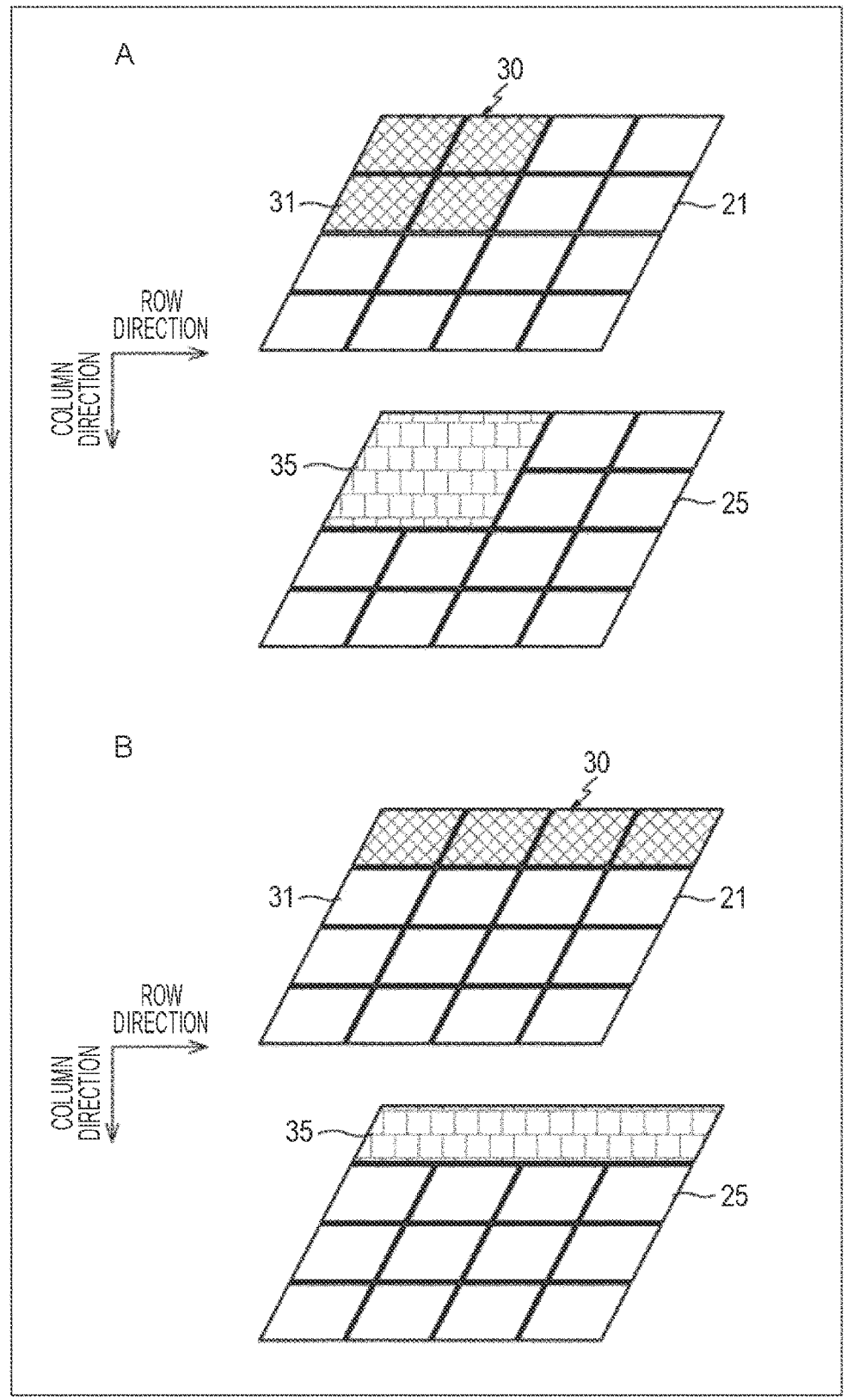

A of FIG. 12 is a diagram illustrating arrangement of the DVS units and connection relation of the DVS units with DVS AFEs according to a first arrangement example in the imaging device according to the first embodiment of the present disclosure, and B of FIG. 12 is a diagram illustrating arrangement of the DVS units and connection relation of the DVS units with DVS AFEs according to a second arrangement example in the imaging device according to the first embodiment of the present disclosure.

Figure 13:
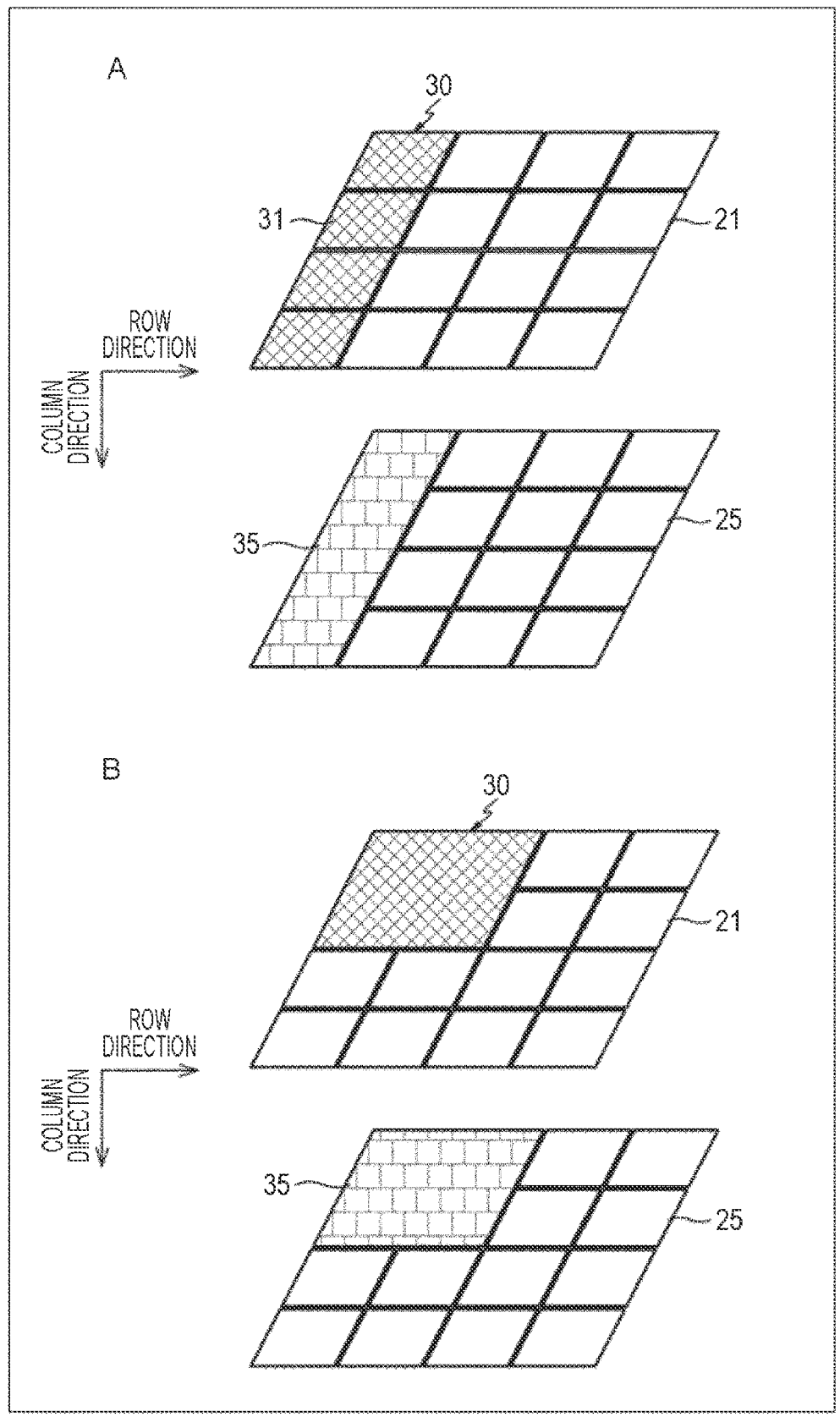

A of FIG. 13 is a diagram illustrating arrangement of the DVS units and connection relation of the DVS units with DVS AFEs according to a third arrangement example in the imaging device according to the first embodiment of the present disclosure, and B of FIG. 13 is a diagram illustrating arrangement of the DVS units and connection relation of the DVS units with DVS AFEs according to a fourth arrangement example in the imaging device according to the first embodiment of the present disclosure.

Figure 14:
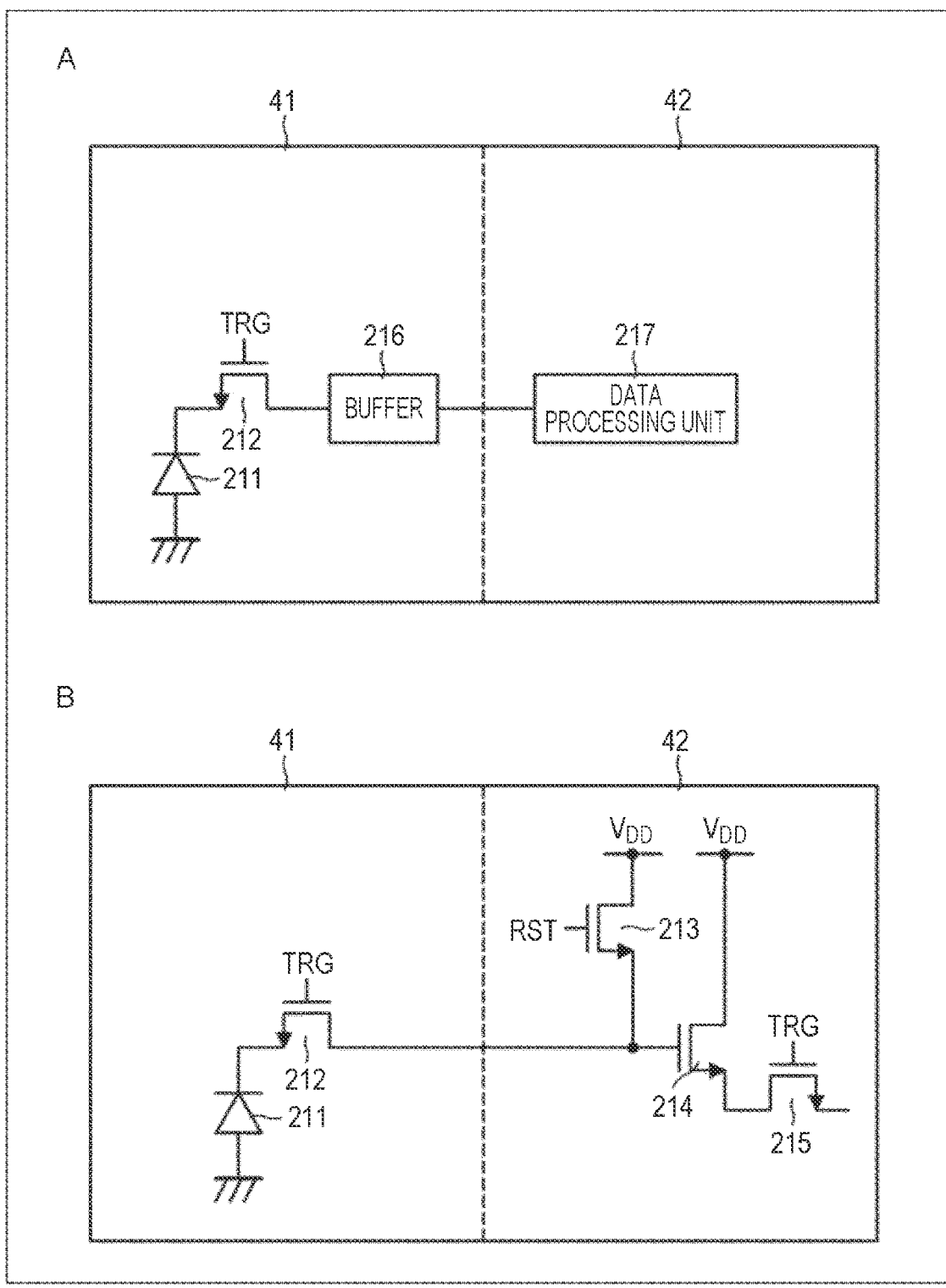

A of FIG. 14 is a diagram schematically illustrating a stacked chip structure according to the first configuration example, and B of FIG. 14 is a diagram schematically illustrating a stacked chip structure according to the second configuration example.

Figure 15:
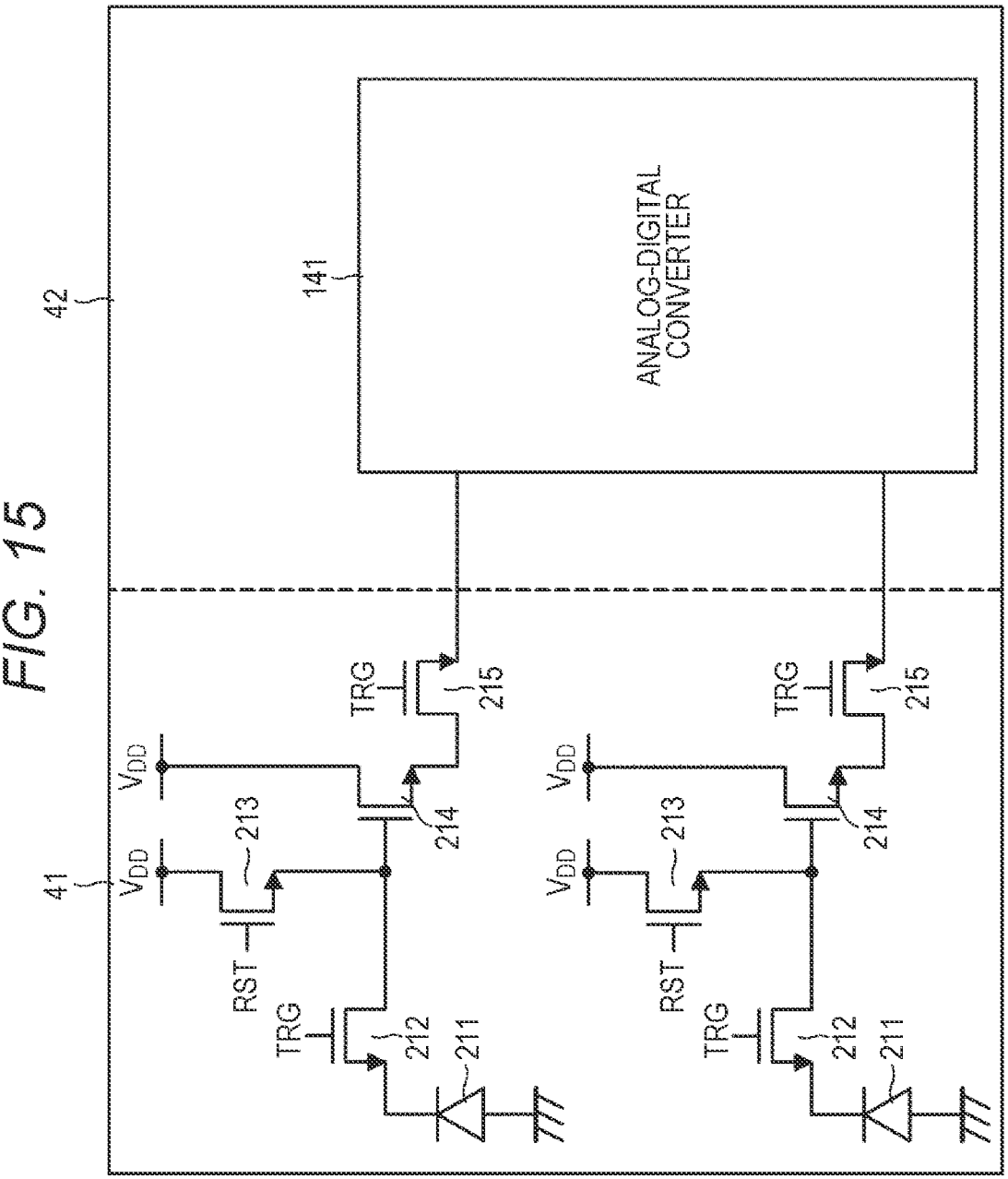

FIG. 15 is a diagram schematically illustrating a stacked chip structure according to the third configuration example.

Figure 16:
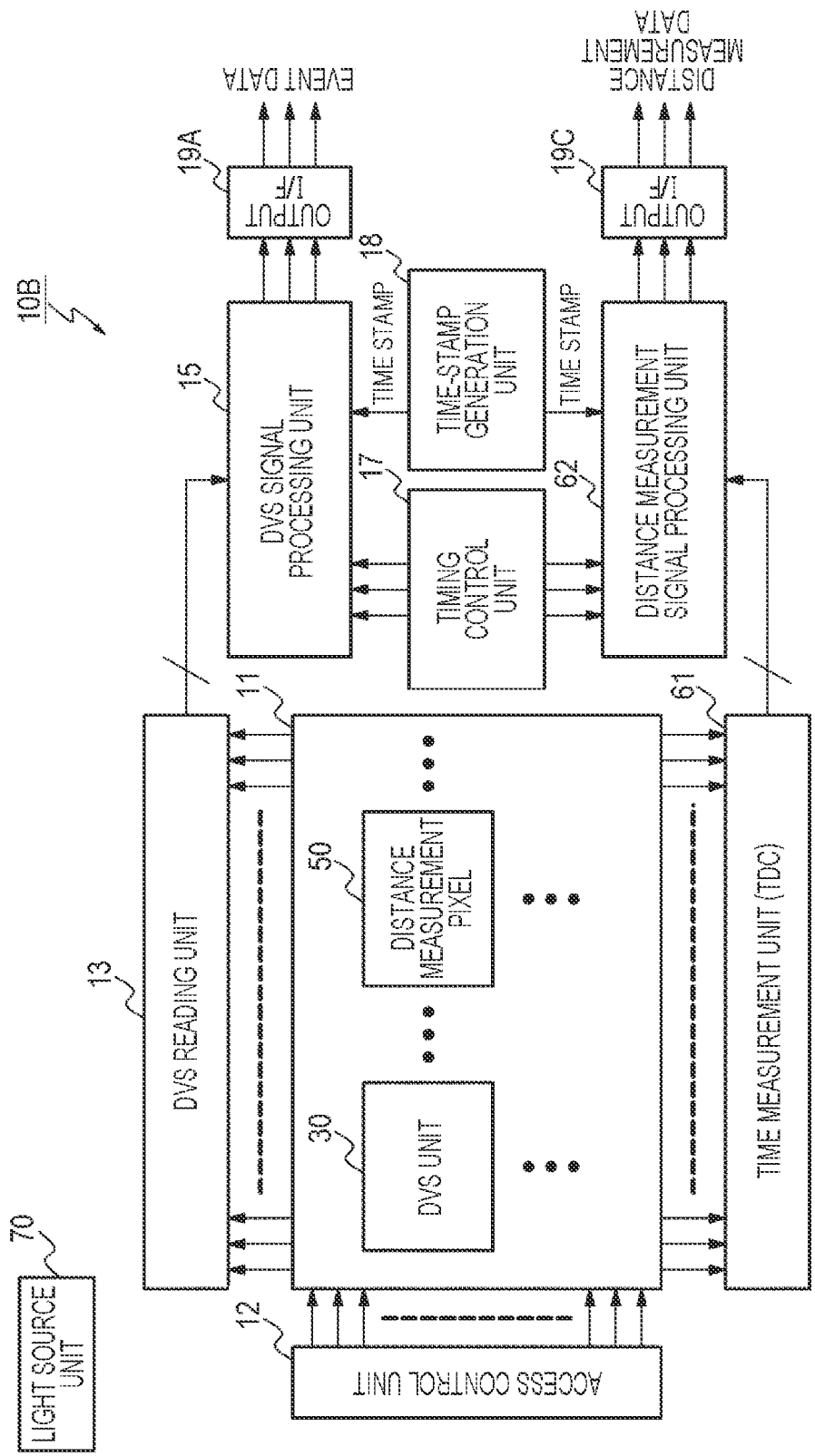

FIG. 16 is a block diagram schematically illustrating a system configuration of an imaging device according to a second embodiment of the present disclosure.

Figure 17:
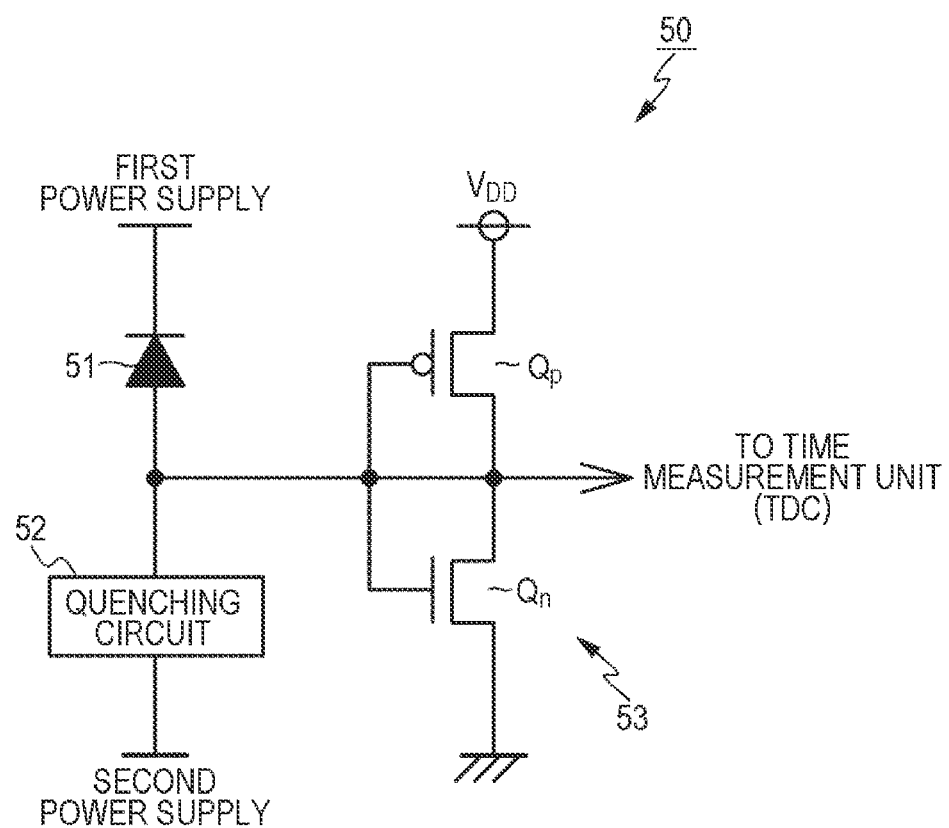

FIG. 17 is a circuit diagram illustrating an example of a configuration of a basic pixel circuit of a distance measurement pixel.

A of FIG. 18 is a schematic diagram illustrating a stacked chip structure according to a first specific example in the imaging device according to the second embodiment of the present disclosure, and B of FIG. 18 is a schematic diagram illustrating a stacked chip structure according to a second specific example in the imaging device according to the second embodiment of the present disclosure.

Figure 19:
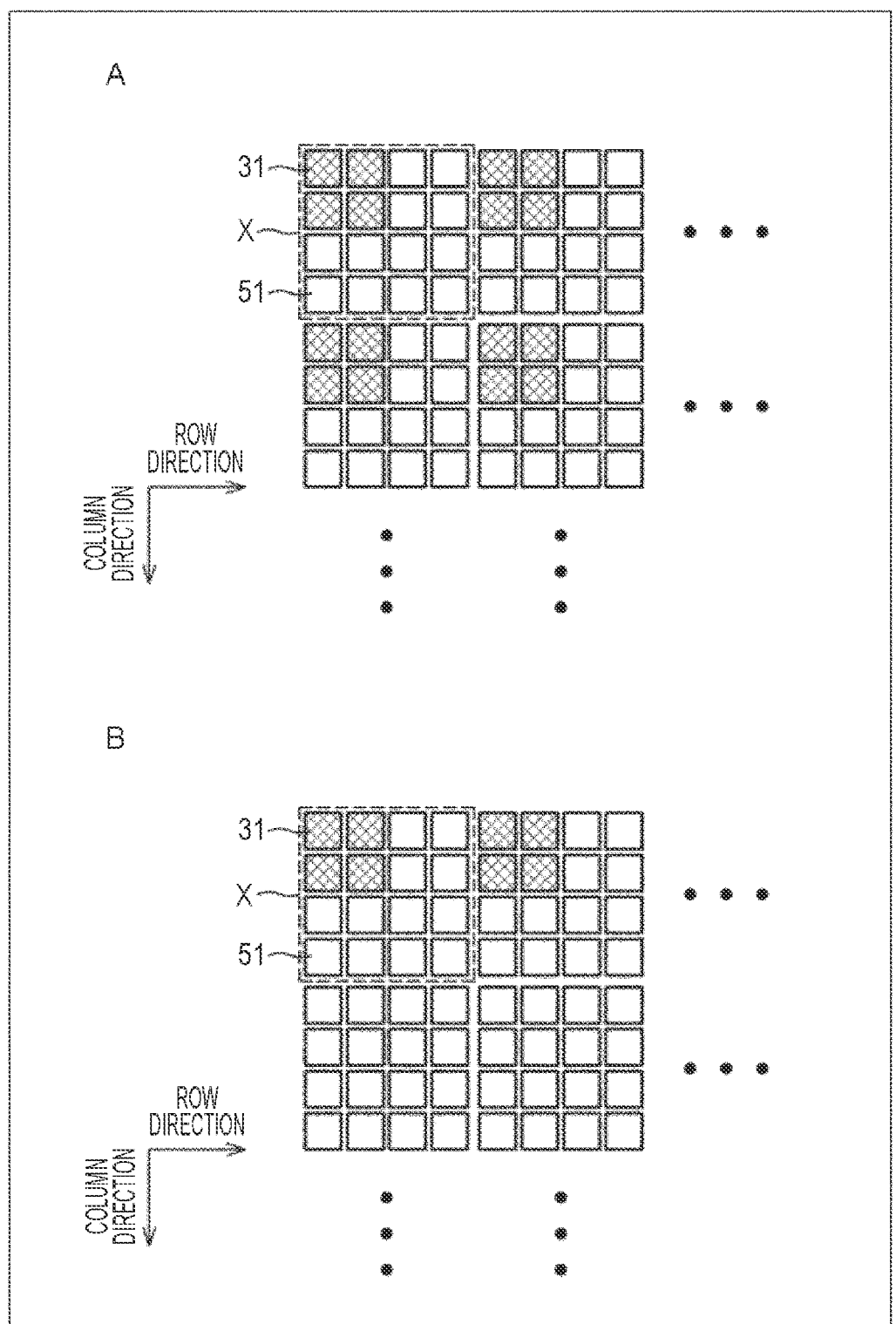

A of FIG. 19 is a diagram illustrating a pixel arrangement according to a first configuration example in the imaging device according to the second embodiment of the present disclosure, and B of FIG. 19 is a diagram illustrating a pixel arrangement according to a second configuration example in the imaging device according to the second embodiment of the present disclosure.

Figure 20:
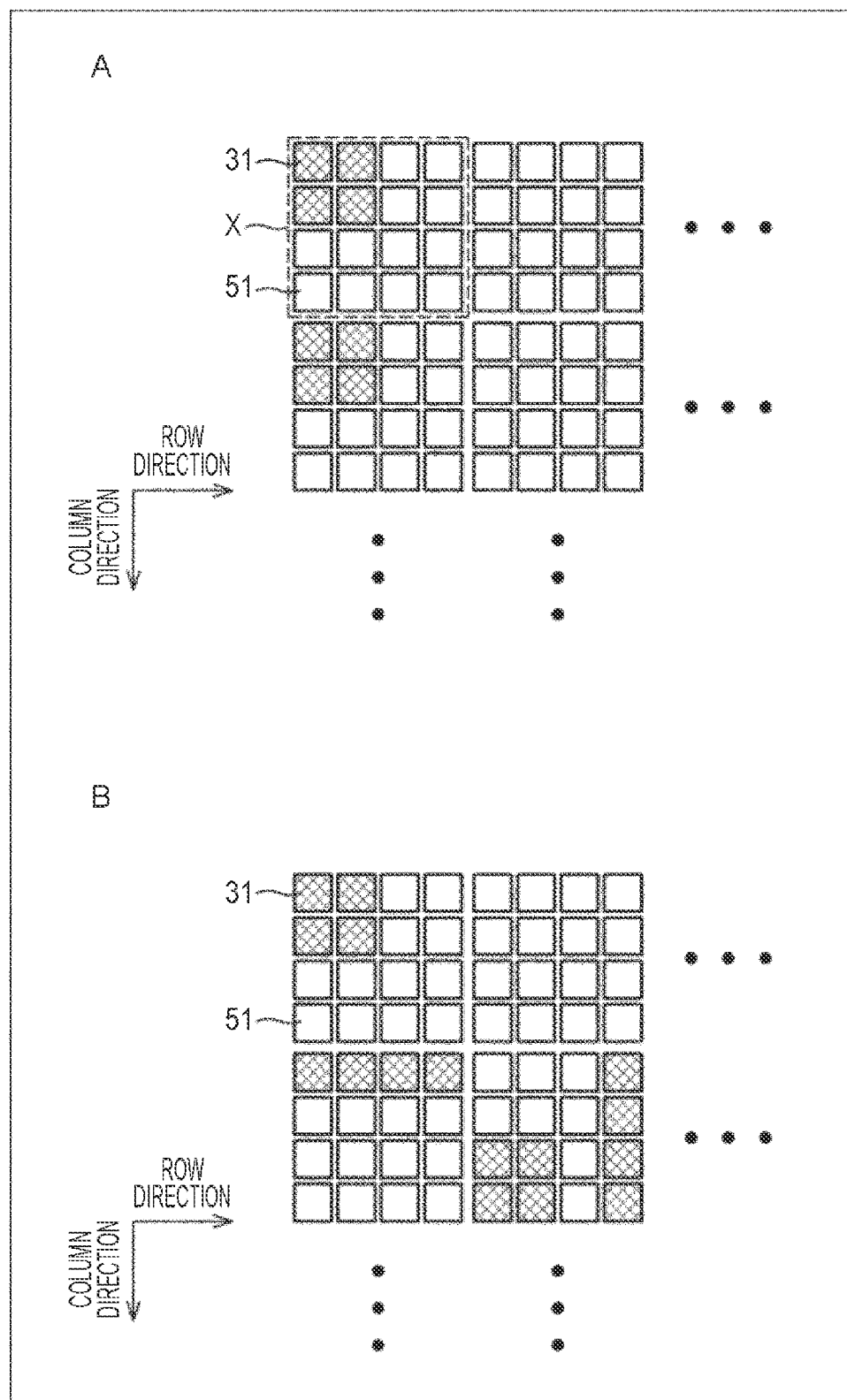

A of FIG. 20 is a diagram illustrating a pixel arrangement according to a third configuration example in the imaging device according to the second embodiment of the present disclosure, and B of FIG. 20 is a diagram illustrating a pixel arrangement according to a fourth configuration example in the imaging device according to the second embodiment of the present disclosure.

A of FIG. 21 is a diagram illustrating arrangement of the DVS units and connection relation of the DVS units with DVS AFEs according to a first arrangement example in the imaging device according to the second embodiment of the present disclosure, and B of FIG. 21 is a diagram illustrating arrangement of the DVS units and connection relation of the DVS units with DVS AFEs according to a second arrangement example in the imaging device according to the second embodiment of the present disclosure.

Figure 22:
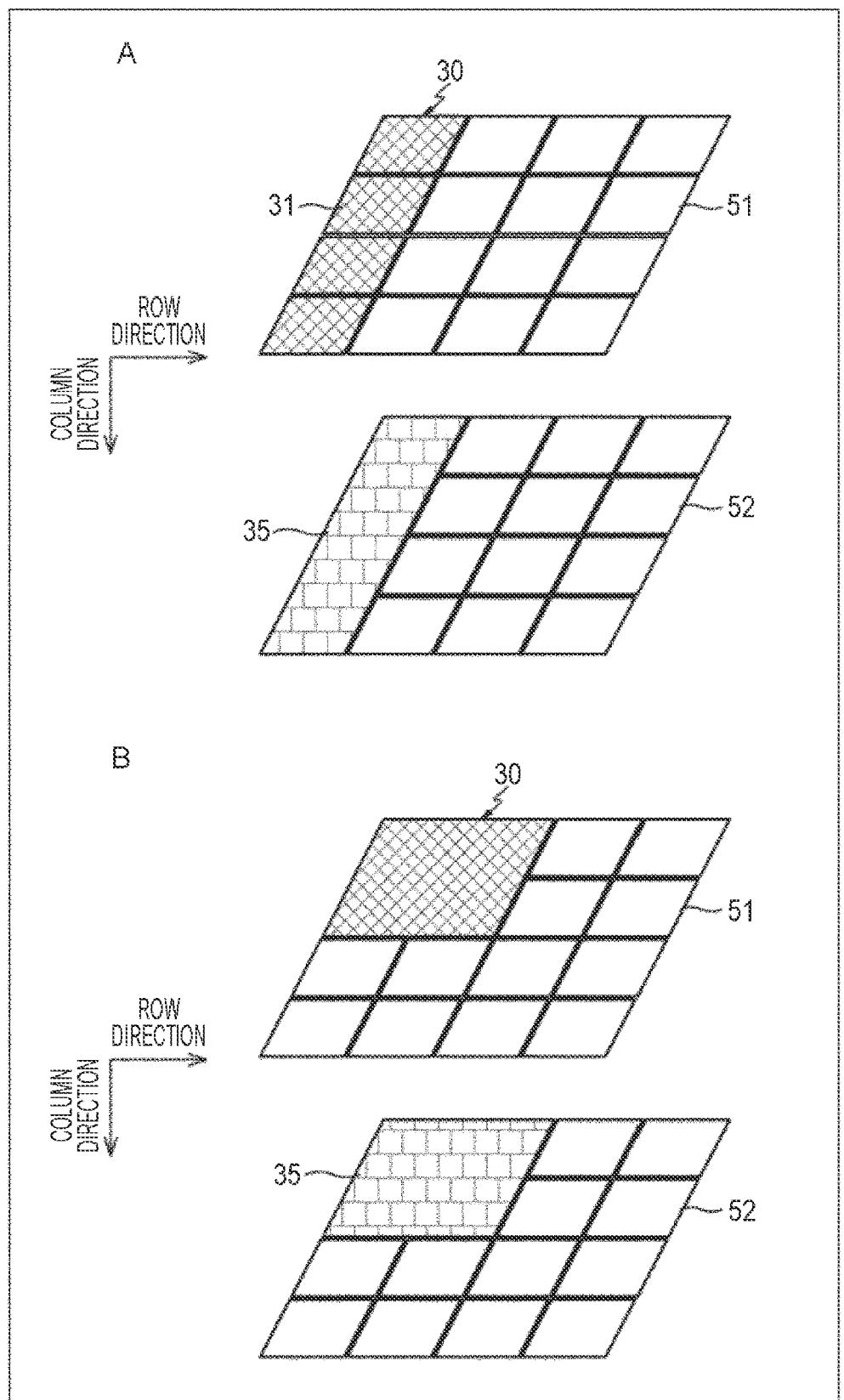

A of FIG. 22 is a diagram illustrating arrangement of the DVS units and connection relation of the DVS units with DVS AFEs according to a third arrangement example in the imaging device according to the second embodiment of the present disclosure, and B of FIG. 22 is a diagram illustrating arrangement of the DVS units and connection relation of the DVS units with DVS AFEs according to a fourth arrangement example in the imaging device according to the second embodiment of the present disclosure.

Figure 23:
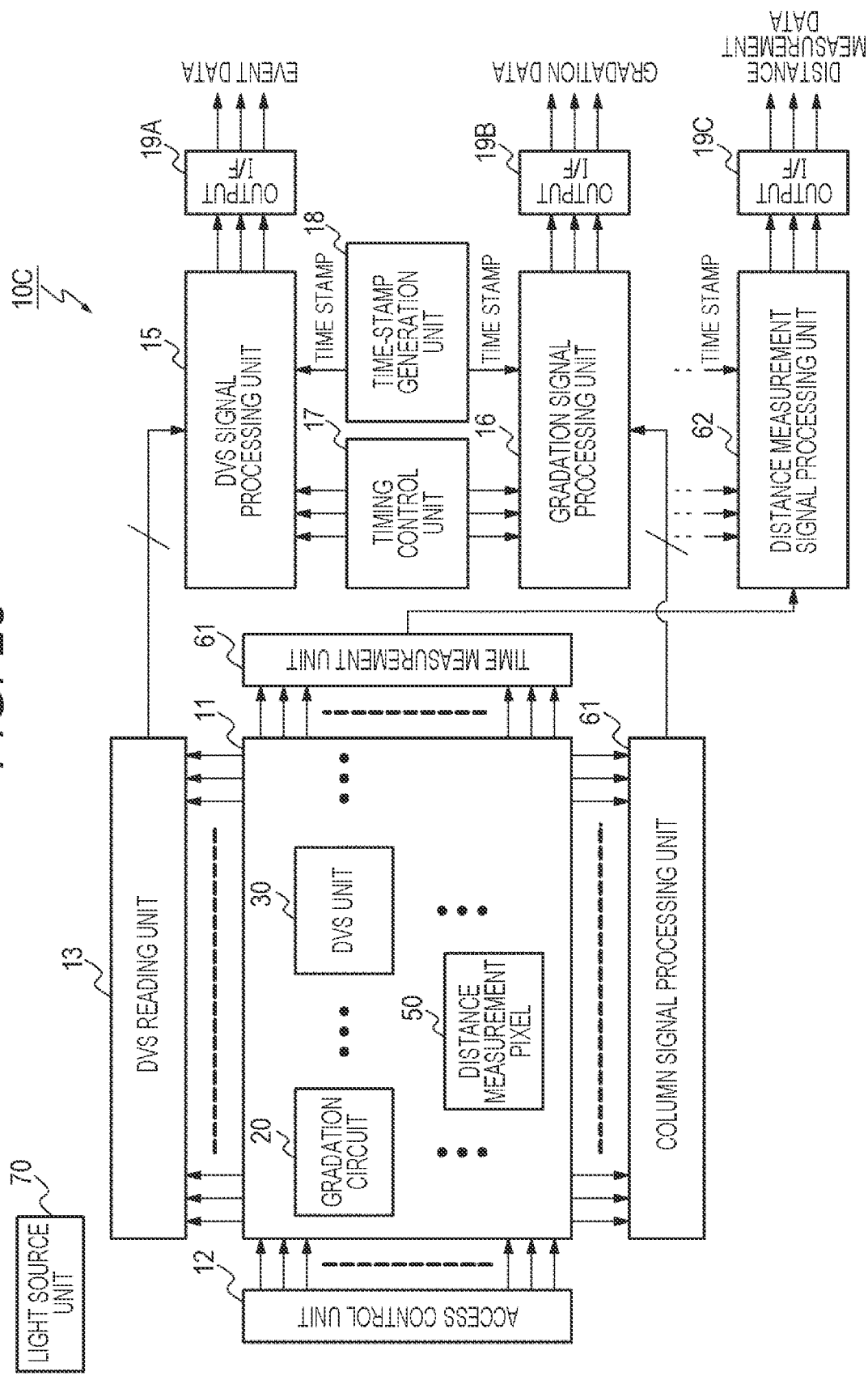

FIG. 23 is a block diagram schematically illustrating a system configuration of an imaging device according to a third embodiment of the present disclosure.

MODES FOR CARRYING OUT THE INVENTION

Modes for carrying out technology of the present disclosure (hereinafter, referred to as embodiments) will be described below with reference to the drawings. The technology of the present disclosure is not limited to the embodiments. In the following description, the same reference signs will be used for the same elements or elements having the same function, and duplicate description will be omitted. Note that the description will be made in the following order.

1. General description of imaging device of present disclosure

2. Imaging device according to first embodiment (event pixel+gradation pixel)

2-1. System configuration example 2-1-1. Configuration example of gradation pixel 2-1-2. Configuration example of DVS pixel 2-1-3. Configuration example of address event detection Unit 2-2. Stacked chip structure 2-2-1. First specific example (example of two-layer structure)

2-2-2. Second specific example (example of three-layer structure)

2-3. Configuration examples of pixel array unit 2-3-1. First configuration example (example in which Units including gradation pixels and DVS pixels are arranged Side by side according to predetermined rule)

2-3-2. Second configuration example (example in which Units including DVS pixels are arranged side by side in units Of pixel rows)

2-3-3. Third configuration example (example in which Units including DVS pixels are arranged side by side in units Of pixel columns)

2-3-4. Fourth configuration example (example in which DVS Units are arranged side by side irregularly)

2-4. DVS unit arrangement examples 2-4-1. First arrangement example (example in which DVS unit includes four DVS pixels arranged side by side in square shape)

2-4-2. Second arrangement example (example in which DVS unit includes four DVS pixels arranged side by side in row direction)

2-4-3. Third arrangement example (example in which DVS unit includes four DVS pixels arranged side by side in column direction)

2-4-4. Fourth arrangement example (example in which size of DVS unit is larger than size of gradation pixel)

2-5. Configuration examples of stacked chip structure in case of gradation pixel 2-5-1. First configuration example of stacked chip structure (configuration example of global shutter function)
2-5-2. Second configuration example of stacked chip structure (configuration example of reading function)
2-5-3. Third configuration example of stacked chip structure (configuration example of area ad)
2-6. Functions and effects of first embodiment
3. Imaging device according to second embodiment (event pixel+distance measurement pixel)
  3-1. System configuration example
  3-2. Stacked chip structure
  3-2-1. First specific example (example in which spad element is mounted on upper chip and quenching circuit is mounted on lower chip)
  3-2-2. Second specific example (example in which plurality of spad elements on upper chip is treated as unit, and quenching circuit and time measurement unit are mounted on Lower chip)
  3-3. Configuration examples of pixel array unit
  3-3-1. First configuration example (example in which units including DVS pixels and distance measurement pixels are arranged in matrix)
  3-3-2. Second configuration example (example in which units including DVS pixels are arranged side by side in units of pixel rows)
  3-3-3. Third configuration example (example in which units including DVS pixels are arranged side by side in units of pixel columns)
  3-3-4. Fourth configuration example (example in which DVS units are arranged randomly)
  3-4. Functions and effects of second embodiment
4. Imaging device according to third embodiment (event pixel+gradation pixel+distance measurement pixel)
5. Modifications
6. Application examples
7. Configurations that present disclosure can have General Description of Imaging Device of Present Disclosure In an imaging device of the present disclosure, when a predetermined number of event pixels are defined as an event pixel unit, the event pixel units can be arranged side by side in a pixel array unit according to a predetermined rule.

In the imaging device of the present disclosure including the above-described preferred configuration, the event pixel units can be combined with a predetermined number of gradation pixels as a pixel unit, and can be arranged in the pixel array unit. Furthermore, the event pixel units can be arranged side by side in units of pixel rows or in units of pixel columns in a pixel array in a matrix in the pixel array unit.

Furthermore, in the imaging device of the present disclosure including the above-described preferred configuration, when a predetermined number of event pixels are defined as an event pixel unit, the event pixel units can be arranged side by side irregularly in the pixel array unit.

Furthermore, in the imaging device of the present disclosure including the above-described preferred configuration, the event pixels can be arranged side by side in an event pixel unit according to a predetermined rule. Specifically, in the event pixel unit, the event pixels can be arranged side by side in a square shape, or arranged side by side in a row direction or side by side in a column direction of the pixel array in a matrix.

Furthermore, in the imaging device of the present disclosure including the above-described preferred configuration, a size of an event pixel can be larger than a size of a gradation pixel. Furthermore, the number of the gradation pixels can be larger than the number of the event pixels.

Furthermore, in the imaging device of the present disclosure including the above-described preferred configuration, in addition to the event pixel and the gradation pixel, a distance measurement pixel can be mixed in the pixel array unit, the distance measurement pixel including a light-receiving element that receives, from a target of distance measurement, reflected light based on irradiation light from a light source unit, and generates a signal in response to reception of a photon. Then, a second-layer semiconductor chip can be provided with, corresponding to the distance measurement pixel, a quenching circuit that controls the light-receiving element.

Furthermore, in the imaging device of the present disclosure including the above-described preferred configuration, the light-receiving element of the distance measurement pixel can include an avalanche photodiode, preferably a single-photon avalanche diode, that operates in a Geiger mode.

Imaging Device According to First Embodiment

An imaging device according to a first embodiment of the present disclosure has a stacked chip structure formed by stacking at least two semiconductor chips including a first-layer semiconductor chip and the second-layer semiconductor chip. Then, event pixels and gradation pixels are mixed in a pixel array unit provided in the first-layer semiconductor chip.

Here, the event pixel is a pixel that detects a phenomenon in which an amount of change in luminance of a pixel exceeds a predetermined threshold value as event occurrence, and outputs an event detection signal. The event pixel is used in a non-scanning type (asynchronous-type) imaging device called a DVS. Therefore, in the following, there is a case where the event pixel is described as a DVS pixel. The gradation pixel outputs a pixel signal at a gradation level according to an amount of incident light.

System Configuration Example

Figure 1:
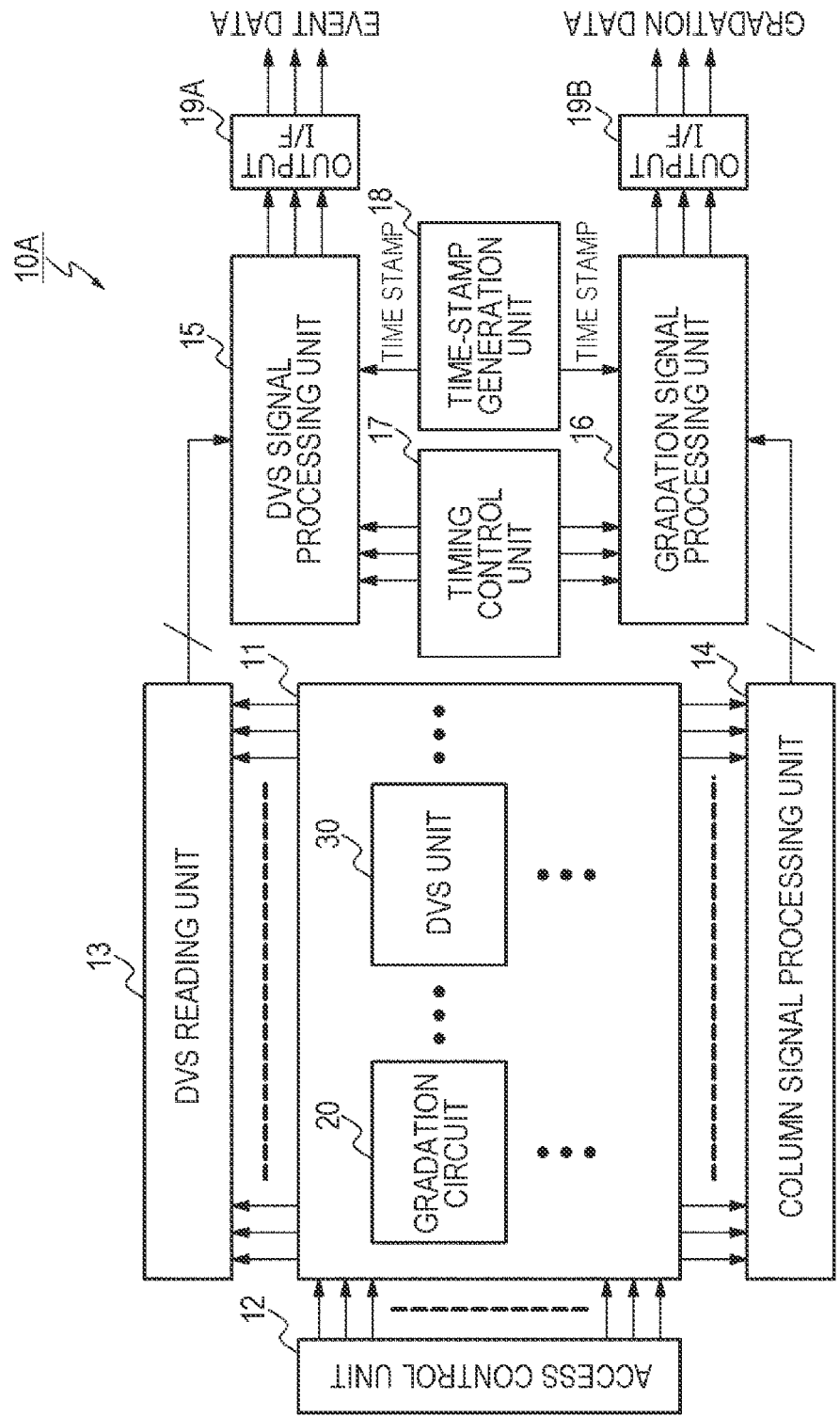
FIG. 1 is a block diagram schematically illustrating a system configuration of an imaging device according to a first embodiment of the present disclosure.

FIG. 1 is a block diagram schematically illustrating a system configuration of the imaging device according to the first embodiment of the present disclosure.

As illustrated in FIG. 1, an imaging device 10A according to the first embodiment includes a pixel array unit 11, an access control unit 12, a DVS reading unit 13, a column signal processing unit 14, a DVS signal processing unit 15, a gradation signal processing unit 16, a timing control unit 17, a time-stamp generation unit 18, and output interfaces (I/Fs) 19A, 19B.

The pixel array unit 11 is provided with a gradation circuit 20 and a DVS unit 30 as an event pixel unit in a mixed state. As illustrated in A of FIG. 2, the gradation circuit 20 includes a gradation pixel 21 and a gradation memory 22 that stores a pixel signal output from the gradation pixel 21. As illustrated in B of FIG. 2, the DVS unit 30 includes a predetermined number of DVS pixels 31, four DVS pixels 31 for example, as a unit. The DVS unit 30 includes, in addition to the four DVS pixels 31, a selector 32 that selects event detection signals output from the four DVS pixels 31, and a DVS analog front-end (AFE) 35 that processes the event detection signals selected by the selector 32.

When reading, from the gradation pixels 21, pixel signals at a gradation level according to an amount of incident light, the access control unit 12 outputs various kinds of drive signals to each of the gradation pixels 21 of the pixel array unit 11. Moreover, when reading the event detection signals from the DVS pixels 31, the access control unit 12 outputs row drive signals to each of the DVS pixels 31 of the pixel array unit 11.

Driven by the access control unit 12, the DVS reading unit 13 reads the event detection signals from each of the DVS pixels 31 of the pixel array unit 11, and supplies the DVS signal processing unit 15 with the read event detection signals as event data.

The column signal processing unit 14 includes, for example, analog-digital converters as many as the number of the pixel columns of the gradation pixels 21, the analog-digital converters being provided for each of the pixel columns, and, driven by the access control unit 12, the column signal processing unit 14 converts analog pixel signals (gradation luminance signals) read from each of the gradation pixels 21 of the pixel array unit 11 into digital pixel signals, and supplies the digital pixel signals to the gradation signal processing unit 16.

The DVS signal processing unit 15 performs signal processing, such as addition of a time stamp as described later, on the event detection signals read from each of the DVS pixels 31 of the pixel array unit 11 by the DVS reading unit 13, and then outputs the event detection signals, as event data, to outside of the imaging device 10A via the output interface (I/F) 19A.

The gradation signal processing unit 16 performs signal processing, such as correlated double sampling (CDS) processing or addition of a time stamp as described later, on the digital pixel signal output from the column signal processing unit 14, and then outputs the digital pixel signals, as gradation data, to outside of the imaging device 10A via the output interface (I/F) 19B.

The timing control unit 17 generates various kinds of timing signals, clock signals, control signals, and the like, and performs drive control of the DVS signal processing unit 15, the gradation signal processing unit 16, and the like on the basis of the generated signals.

For the event data output from the DVS reading unit 13 and pixel data output from the column signal processing unit 14, the time-stamp generation unit 18 generates a time stamp (time information) indicating a relative time of timing of outputting the event data or the pixel data. The generated time stamp is added to the event data in the DVS signal processing unit 15 and to the pixel data in the gradation signal processing unit 16.

Next, specific configurations of a gradation pixel 21 and a DVS pixel 31 will be described with a specific example.

Configuration Example of Gradation Pixel

FIG. 3 is a circuit diagram illustrating a specific example of a configuration of the gradation pixel 21.

The gradation pixel 21 includes, for example, a photodiode 211 as a photoelectric conversion element. In addition to the photodiode 211, the gradation pixel 21 includes a transfer transistor 212, a reset transistor 213, an amplification transistor 214, and a selection transistor 215.

Here, the four transistors, which are the transfer transistor 212, the reset transistor 213, the amplification transistor 214, and the selection transistor 215, use an N-type MOS field effect transistor (FET), for example. In this regard however, a combination of the conductivity types of the four transistors 212 to 215 exemplified here is merely an example, and the combination is not limited thereto.

For the gradation pixels 21, a plurality of pixel control lines is wired in common to the respective gradation pixels 21 on the same pixel row. The plurality of pixel control lines is connected, in units of pixel rows, to output ends of the access control unit 12 illustrated in FIG. 1, the output ends being corresponding the respective pixel rows. When reading, from the gradation pixels 21, pixel signals at a gradation level according to an amount of incident light, the access control unit 12 appropriately outputs, to the plurality of pixel control lines, various kinds of drive signals, specifically, a transfer signal TRG, a reset signal RST, and a selection signal SEL.

The photodiode 211 has an anode electrode connected to a low-potential-side power supply (ground, for example), photoelectrically converts received light into photoelectric charge (here, photoelectrons) of a charge amount according to an amount of the light, and accumulates the photoelectric charge. A cathode electrode of the photodiode 211 is electrically connected to a gate electrode of the amplification transistor 214 via the transfer transistor 212. Here, a region where the gate electrode of the amplification transistor 214 is electrically connected is a floating diffusion (floating diffusion region/impurity diffusion region) FD. The floating diffusion FD is a charge-voltage conversion unit that converts charge into a voltage.

The access control unit 12 provides a gate electrode of the transfer transistor 212 with a transfer signal TRG in which a high level (a $V_{DD}$ level, for example) becomes active. The transfer transistor 212 becomes conductive in response to the transfer signal TRG, thereby transferring, to the floating diffusion FD, the photoelectric charge photoelectrically converted by the photodiode 211 and accumulated in the photodiode 211.

The reset transistor 213 is connected between a node of a high-potential-side power supply voltage $V_{DD}$ and the floating diffusion FD. The access control unit 12 provides a gate electrode of the reset transistor 213 with a reset signal RST in which a high level becomes active. The reset transistor 213 becomes conductive in response to the reset signal RST, and resets the floating diffusion FD by discarding the charge of the floating diffusion FD to the node of the voltage $V_{DD}$.

The amplification transistor 214 has a gate electrode connected to the floating diffusion FD, and has a drain electrode connected to a node of a high-potential-side power supply voltage $V_{DD}$. The amplification transistor 214 serves as a source-follower input unit that reads a signal obtained by photoelectric conversion in the photodiode 211. That is, a source electrode of the amplification transistor 214 is connected to a signal line VSL via the selection transistor 215. Then, the amplification transistor 214 and a load current source I connected to one end of the signal line VSL are in a source follower configuration in which voltage of the floating diffusion FD is converted into potential of the signal line VSL.

The selection transistor 215 has a drain electrode connected to a source electrode of the amplification transistor 214, and has a source electrode connected to the signal line VSL. The access control unit 12 provides a gate electrode of the selection transistor 215 with a selection signal SEL in which a high level becomes active. The selection transistor 215 becomes conductive in response to the selection signal SEL, thereby transmitting a signal output from the amplification transistor 214 to the signal line VSL with the gradation pixel 21 being selected.

Note that, in the above-described circuit example, as a circuit configuration of the gradation pixel 21, a 4Tr configuration including the transfer transistor 212, the reset transistor 213, the amplification transistor 214, and the selection transistor 215, that is, including four transistors (Tr), has been described as an example, but the circuit configuration is not limited thereto. For example, the circuit configuration can be a 3Tr configuration by omitting the selection transistor 215 and having the amplification transistor 214 to have functions of the selection transistor 215, or can be a circuit configuration of 5Tr or more by increasing the number of the transistors as necessary.

Configuration Example of DVS Pixel

FIG. 4 is a circuit diagram illustrating a specific example of a configuration of a DVS pixel 31.

Each of the plurality of (four, for example) DVS pixels 31 that constitute the DVS unit 30 includes a photoelectric conversion unit 311 and an address event detection unit 312. Note that an arbiter unit 34 is provided as one of peripheral circuits of the DVS pixel 31. The arbiter unit 34 arbitrates a request from each of the plurality of DVS pixels 31 and transmits a response based on an arbitration result to the DVS pixel 31.

In the DVS pixel 31 having the above-described configuration, the photoelectric conversion unit 311 includes a photoelectric conversion element (light-receiving element) 3111 and a control transistor 3112. As the control transistor 3112, for example, an N-type metal oxide semiconductor (MOS) transistor can be used.

The photoelectric conversion element (light-receiving element) 3111 photoelectrically converts incident light and generates charge of a charge amount according to the amount of incident light. For example, the access control unit 12 (refer to FIG. 1) supplies a gate electrode of the control transistor 3112 with the transfer signal TRG. In response to the transfer signal TRG, the control transistor 3112 supplies the address event detection unit 312 with charge photoelectrically converted by the photoelectric conversion element 3111.

On the basis of whether or not an amount of change in photoelectric current from the photoelectric conversion unit 3111 has exceeded a predetermined threshold value, the address event detection unit 312 detects whether or not an address event (hereinafter, may be simply described as an "event") has occurred. The address event includes, for example, an ON-event indicating that the amount of change in the photoelectric current exceeds an upper limit threshold value, and an OFF-event indicating that the amount of change in the photoelectric current falls below a lower limit threshold value. Furthermore, the event data (event detection signal) indicating a result of detecting the address event includes, for example, one bit for indicating an ON-event detection result and one bit for indicating an OFF-event detection result.

When an address event occurs, the address event detection unit 312 supplies the arbiter unit 34 with a request for requesting transmission of the event detection signal. Then, upon receiving a response to the request from the arbiter unit 34, the address event detection unit 312 supplies an event detection signal (event data) to the DVS reading unit 13.

Configuration Example of Address Event Detection Unit

FIG. 5 is a block diagram illustrating an example of a configuration of the address event detection unit 312. As illustrated in FIG. 5, the address event detection unit 312 according to the present configuration example includes a current-voltage conversion unit 3121, a buffer 3122, a subtractor 3123, a quantizer 3124, and a transfer unit 3125.

The current-voltage conversion unit 3121 converts the photoelectric current from the photoelectric conversion unit 311 of the DVS pixel 31 into a logarithmic voltage signal. The current-voltage conversion unit 3121 supplies the buffer 3122 with the voltage signal converted by the current-voltage conversion unit 3121. The buffer 3122 buffers the voltage signal supplied from the current-voltage conversion unit 3121 and supplies the voltage signal to the subtractor 3123.

The access control unit 12 (refer to FIG. 1) supplies the subtractor 3123 with a row drive signal. The subtractor 3123 reduces a level of the voltage signal supplied from the buffer 3122 according to the row drive signal. Then, the subtractor 3123 supplies the quantizer 3124 with the voltage signal after the level reduction. The quantizer 3124 quantizes the voltage signal supplied from the subtractor 3123 into a digital signal and outputs the digital signal to the transfer unit 3125 as an event detection signal (event data).

The transfer unit 3125 transfers the event detection signal (event data) supplied from the quantizer 3124 to the arbiter unit 34 or the like. When occurrence of an address event is detected, the transfer unit 3125 supplies the arbiter unit 34 with a request for requesting transmission of the event detection signal. Then, upon receiving a response to the request from the arbiter unit 34, the transfer unit 3125 supplies an event detection signal (event data) to the DVS reading unit 13. Reading of the event data from the DVS pixels 31 can be performed by reading a plurality of rows.

[Stacked Chip Structure]

In FIG. 1, for convenience, the system configuration of the imaging device 10A according to the first embodiment is illustrated as a so-called planar structure in which the pixel array unit 11, the access control unit 12, the DVS reading unit 13, the column signal processing unit 14, the DVS signal processing unit 15, the gradation signal processing unit 16, the timing control unit 17, the time-stamp generation unit 18, and the like are planarly arranged. In this regard however, the imaging device 10A according to the first embodiment has a stacked chip structure formed by stacking at least two semiconductor chips including the first-layer semiconductor chip and the second-layer semiconductor chip. Hereinafter, a specific example of the stacked chip structure will be described.

First Specific Example

A first specific example is an example in which the stacked chip structure has a two-layer structure. A schematic diagram of the stacked chip structure according to the first specific example is illustrated in FIG. 6.

As illustrated in FIG. 6, the stacked chip structure according to the first specific example has a two-layer structure in which a first-layer semiconductor chip 41 and a second-layer semiconductor chip 42 are stacked. Then, the first-layer semiconductor chip 41 is provided with the pixel array unit 11 in which the gradation pixels 21 and the DVS pixels 31 are mixed. That is, the first-layer semiconductor chip 41 is a pixel chip provided with the gradation pixels 21 and the DVS pixels 31.

The second-layer semiconductor chip 42 is provided with a pixel analog front-end (AFE) region 44 corresponding to the pixel array unit 11 of the first-layer semiconductor chip 41. Then, in the pixel AFE region 44, corresponding to the gradation pixels 21 and the DVS pixels 31, an analog front-end unit for the gradation pixels 21 including the gradation memory 22 (refer to A of FIG. 2), and an analog front-end unit for the DVS pixels 31 including the DVS AFE 35 (refer to B of FIG. 2) are provided. That is, the second-layer semiconductor chip 42 is a pixel AFE chip provided with the pixel AFE region 44.

Moreover, in the second-layer semiconductor chip 42, the access control unit 12, the DVS reading unit 13, the column signal processing unit 14, the DVS signal processing unit 15, the gradation signal processing unit 16, the timing control unit 17, the time-stamp generation unit 18, and the like are further provided in a peripheral region of the pixel AFE region 44. Note that the gradation pixels 21 and DVS pixels 31 of the first-layer semiconductor chip 41, and respective analog front-end units of the second-layer semiconductor chip 42 are electrically connected via bonding parts 45A, 45B formed by metal-metal bonding including Cu—Cu bonding, through-silicon via (TSV), a micro bump, or the like.

Here, there will be described a correspondence between the gradation pixels 21 and DVS pixels 31 of the first-layer semiconductor chip 41 serving as an upper chip, and an analog front-end unit 25 for the gradation pixels 21 and an analog front-end unit 35 for the DVS pixels 31, the analog front-end units belonging to the second-layer semiconductor chip 42 serving as a lower chip.

A of FIG. 7 is a diagram illustrating a correspondence 1 between the gradation pixels 21 and DVS pixels 31 of the first-layer semiconductor chip 41, and the respective analog front-end units 25, 35 of the second-layer semiconductor chip 42. In the correspondence 1 illustrated in A of FIG. 7, in the first-layer semiconductor chip 41, the DVS unit 30 includes four DVS pixels 31 as a unit, for example. Then, in units of the DVS unit 30, the DVS pixels 31 are associated with the analog front-end unit 35 for the DVS pixels 31. Furthermore, the gradation pixels 21 are associated with the analog front-end unit 25 for the gradation pixels 21 on a one-to-one basis.

B of FIG. 7 is a diagram illustrating a correspondence 2 between the gradation pixels 21 and DVS pixels 31 of the first-layer semiconductor chip 41, and the respective analog front-end units 25, 35 of the second-layer semiconductor chip 42. In the correspondence 2 illustrated in B of FIG. 7, in the first-layer semiconductor chip 41, the DVS unit 30 includes four DVS pixels 31 as a unit, for example, and correspondingly, with respect to the gradation pixels 21, a gradation pixel unit 24 includes four pixels as a unit. Then, between the first-layer semiconductor chip 41 and the second-layer semiconductor chip 42, the gradation pixel units 24 and DVS unit 30 are associated with the respective analog front-end units 25, 35 on a one-to-one basis in units of unit.

FIG. 8 illustrates an image diagram of a pixel array of the gradation pixels 21 and the DVS pixels 31. Here, a Bayer array of red (R)/green (G)/blue (B) is exemplified for the gradation pixels 21 of the first-layer semiconductor chip 41 serving as the upper chip. In the example in the image diagram illustrated in FIG. 8, the DVS pixels 31 are partially arranged in the pixel array having a Bayer array of R/Gr/Gb/B. As is clear from FIG. 8, the number of the gradation pixels 21 is larger than the number of the DVS pixels 31, which are event pixels. Thus, by arranging a larger number of gradation pixels 21 than the DVS pixels 31, it is possible to improve image quality of gradation data.

In the second-layer semiconductor chip 42 serving as the lower chip, an analog front-end unit 35 for the DVS pixels 31 is shared by four DVS pixels 31 of 2×2, and analog front-end units 25 for the gradation pixels 21 are electrically connected to the gradation pixels 21 of the upper chip in units of pixels, by which a voltage-domain global shutter is implemented.

Second Specific Example

A second specific example is an example in which the stacked chip structure has a three-layer structure. A schematic diagram of the stacked chip structure according to the second specific example is illustrated in FIG. 9.

As illustrated in FIG. 9, the stacked chip structure according to the second specific example has a three-layer structure in which the first-layer semiconductor chip 41, the second-layer semiconductor chip 42, and a third-layer semiconductor chip 43 are stacked. Then, the first-layer semiconductor chip 41 is provided with the pixel array unit 11 in which the gradation pixels 21 and the DVS pixels 31 are mixed. That is, the first-layer semiconductor chip 41 is a pixel chip provided with the gradation pixels 21 and the DVS pixels 31.

The second-layer semiconductor chip 42 is provided with a pixel analog front-end (AFE) region 44 corresponding to the pixel array unit 11 of the first-layer semiconductor chip 41. Then, in the pixel AFE region 44, corresponding to the gradation pixels 21 and the DVS pixels 31, an analog front-end unit for the gradation pixels 21 including the gradation memory 22 (refer to A of FIG. 2), and an analog front-end unit for the DVS pixels 31 including the DVS AFE 35 (refer to B of FIG. 2) are provided. That is, the second-layer semiconductor chip 42 is a pixel AFE chip provided with the pixel AFE region 44.

In the third-layer semiconductor chip 43, the access control unit 12, the DVS reading unit 13, the column signal processing unit 14, the DVS signal processing unit 15, the gradation signal processing unit 16, the timing control unit 17, the time-stamp generation unit 18, and the like are provided. Note that the first-layer semiconductor chip 41 and the second-layer semiconductor chip 42 are electrically connected with each other via the bonding parts 45A, 45B formed by metal-metal bonding including Cu—Cu bonding, TSV, a micro bump, or the like, and the second-layer semiconductor chip 42 and the third-layer semiconductor chip 43 are electrically connected with each other via bonding parts 45B, 45C formed by metal-metal bonding including Cu—Cu bonding, TSV, a micro bump, or the like.

In the above-described specific example, the two-layer structure and the three-layer structure are exemplified as a stacked chip structure, but the stacked chip structure is not limited to the two-layer structure and the three-layer structure, and a stacked chip structure with four or more layers can also be adopted.

Configuration Examples of Pixel Array Unit

Next, configuration examples of the pixel array unit 11 in which the gradation pixels 21 and the DVS pixels 31 are mixed in the imaging device 10A according to the first embodiment will be described.

First Configuration Example

A first configuration example of the pixel array unit 11 is an example in which units including the gradation pixels 21 and the DVS pixels 31 are arranged side by side in the pixel array unit 11 according to a predetermined rule. A of FIG. 10 illustrates a pixel arrangement according to the first configuration example.

The pixel arrangement according to the first configuration example has a configuration in which, for example, pixel units X are two-dimensionally arranged in a matrix, each of the pixel units X having 12 gradation pixels 21 in units of four pixels (R/Gr/Gb/B) and the DVS unit 30 in units of four DVS pixels 31 that are arranged side by side in a square shape. With the pixel arrangement according to the first configuration example, gradation data and event data can be linked to each other in units of unit.

Second Configuration Example

A second configuration example is an example in which units including the DVS pixels 31 are arranged side by side in units of pixel rows. B of FIG. 10 illustrates a pixel arrangement according to the second configuration example.

The pixel arrangement according to the second configuration example has a configuration in which, for example, the pixel units X are arranged side by side in units of pixel rows, the pixel units X having 12 gradation pixels 21 in units of four pixels (R/Gr/Gb/B) and the DVS units 30 in units of four DVS pixels 31 that are arranged side by side in a square shape. With the pixel arrangement according to the second configuration example, when accessing a gradation pixel 21, it is possible to select a pixel row in which the DVS pixels 31 do not exist (that is, a pixel row without a defect).

Third Configuration Example

A third configuration example is an example in which units including the DVS pixels 31 are arranged side by side in units of pixel columns. A of FIG. 11 illustrates a pixel arrangement according to the third configuration example.

The pixel arrangement according to the third configuration example has a configuration in which, for example, the pixel units X are arranged side by side in units of pixel columns, the pixel units X having 12 gradation pixels 21 in units of four pixels (R/Gr/Gb/B) and the DVS units 30 in units of four DVS pixels 31 that are arranged side by side in a square shape. With the pixel arrangement according to the third configuration example, as compared with a case of the pixel arrangement according to the second configuration example, amounts of event data included in the pixel rows can be uniformed, and therefore, gradation data (R/G/B data) with stable image quality can be acquired. This point is similar in a case of the pixel arrangement according to the first configuration example.

Fourth Configuration Example

A fourth configuration example is an example in which the DVS units 30 are arranged side by side irregularly. B of FIG. 11 illustrates a pixel arrangement according to the fourth configuration example.

The pixel arrangement according to the fourth configuration example has a configuration in which the DVS units 30 in units of four DVS pixels 31 are randomly arranged for example, the four DVS pixels 31 are arranged side by side in a square shape or arranged side by side in a row direction/column direction, for example. With the pixel arrangement according to the fourth configuration example, similarly to compressed sensing, high-resolution data can be restored.

DVS Unit Arrangement Examples

Next, configuration examples of the DVS unit 30 in the imaging device 10A according to the first embodiment will be described. Here, for example, provided that the DVS unit 30 includes four DVS pixels 31 as a unit, arrangement of the DVS unit 30, and connection relations between the DVS unit 30 and the DVS analog front-end (AFE) 35 in a stacked chip structure will be described. The DVS pixels 31 are arranged side by side in the DVS unit 30 according to a predetermined rule.

First Arrangement Example

A first arrangement example is an example in which the DVS unit 30 includes four DVS pixels 31 arranged side by side in a square shape. A of FIG. 12 illustrates arrangement of the DVS unit 30 and a connection relation of the DVS unit 30 with the DVS AFE 35 according to the first arrangement example. In the first arrangement example of the DVS unit 30, one DVS AFE 35 having a size of a rectangular region corresponding to the four DVS pixels 31 is associated with and electrically connected to the four DVS pixels 31 arranged side by side in a square shape.

Second Arrangement Example

A second arrangement example is an example in which the DVS unit 30 includes four DVS pixels 31 arranged side by side in a row direction. B of FIG. 12 illustrates arrangement of the DVS unit and a connection relation of the DVS unit with the DVS AFE 35 according to the second arrangement example. In the second arrangement example of the DVS unit 30, one DVS AFE 35 having a size of a horizontally-oriented rectangular region corresponding to the four DVS pixels 31 is associated with and electrically connected to the four DVS pixels 31 arranged in a horizontally-oriented rectangular shape in a row direction.

Third Arrangement Example

A third arrangement example is an example in which the DVS unit 30 includes four DVS pixels 31 arranged side by side in a column direction. A of FIG. 13 illustrates arrangement of the DVS unit and a connection relation of the DVS unit with the DVS AFE 35 according to the third arrangement example. In the third arrangement example of the DVS unit 30, one DVS AFE 35 having a size of a vertically oriented rectangular region corresponding to the four DVS pixels 31 is associated with and electrically connected to the four DVS pixels 31 arranged side by side in a vertically oriented rectangular shape in a column direction.

Fourth Arrangement Example

A fourth arrangement example is an example in which a size of the DVS unit 30 is larger than a size of a gradation pixel 21. B of FIG. 13 illustrates arrangement of the DVS unit and a connection relation of the DVS unit with the DVS AFE 35 according to the fourth arrangement example. In the fourth arrangement example of the DVS unit 30, the size of the DVS unit 30 is larger than the size of the gradation pixels 21. For example, the size of the DVS unit 30 is as large as a size of four DVS pixels 31 arranged side by side in a square shape. Then, one DVS AFE 35 having the same size as the DVS unit 30 is associated with and electrically connected to the DVS unit 30.

Configuration Examples of Stacked Chip Structure in Case of Gradation Pixel

Next, a configuration example of a stacked chip structure in a case of the gradation pixel 21 will be described.

First Configuration Example of Stacked Chip Structure

A first configuration example of the stacked chip structure is a configuration example of a global shutter function. The stacked chip structure according to the first configuration example is schematically illustrated in A of FIG. 14. In the stacked chip structure according to the first configuration example, the photodiode 211, the transfer transistor 212, and a buffer 216 are two-dimensionally arranged in a matrix for each pixel in the first-layer semiconductor chip 41 serving as the upper chip. Furthermore, corresponding to a pixel, a data processing unit 217, which processes a signal component (so-called D-phase data) and a reset component (so-called P-phase data), or the like is mounted on the second-layer semiconductor chip 42 serving as the lower chip.

Second Configuration Example of Stacked Chip Structure

A second configuration example of the stacked chip structure is a configuration example of a reading function. The stacked chip structure according to the second configuration example is schematically illustrated in A of FIG. 14. In the stacked chip structure according to the second configuration example, the photodiode 211 and the transfer transistor 212 are two-dimensionally arranged in a matrix for each pixel in the first-layer semiconductor chip 41 serving as the upper chip. Furthermore, corresponding to a pixel, the reset transistor 213, the amplification transistor 214, the selection transistor 215, and the like are mounted on the second-layer semiconductor chip 42 serving as the lower chip.

Third Configuration Example of Stacked Chip Structure

A third configuration example of the stacked chip structure is a configuration example of an area AD. The stacked chip structure according to the third configuration example is schematically illustrated in FIG. 15. In the stacked chip structure according to the third configuration example, for example, the gradation pixels 21 having the circuit configuration illustrated in FIG. 3 are two-dimensionally arranged in a matrix for each pixel in the first-layer semiconductor chip 41 serving as the upper chip. Furthermore, corresponding to two-dimensionally arranged gradation pixels 21, an analog-digital converter (ADC) 141 is mounted on the second-layer semiconductor chip 42 serving as the lower chip. This configuration is a configuration example of the area AD.

Functions and Effects of First Embodiment

As described above, the imaging device 10A according to the first embodiment has a configuration in which the gradation pixels 21 and the DVS pixels 31 as event pixels are mixed in the pixel array unit 11. Therefore, with the imaging device 10A according to the first embodiment, it is possible to output not only the event detection signal (event data) indicating event occurrence, but also a pixel signal (gradation data) at a gradation level according to an amount of incident light. With this arrangement, as an example, by detecting a motion of a subject with the DVS pixels 31 and performing correction by using the event data, it is possible to achieve imaging without motion blur even in a dim environment, and acquire gradation data with excellent S/N by using the gradation pixels 21.

Imaging Device According to Second Embodiment

An imaging device according to a second embodiment of the present disclosure has a stacked chip structure formed by stacking at least two semiconductor chips including a first-layer semiconductor chip and a second-layer semiconductor chip, in which event pixels and distance measurement pixels are mixed in a pixel array unit provided in the first-layer semiconductor chip.

Here, the distance measurement pixel is a pixel including a light-receiving element (photodetection element) that receives, from a target of distance measurement, reflected light based on irradiation light from a light source unit, and generates a signal in response to reception of a photon. For example, a single-photon avalanche diode (SPAD) element can be exemplified as the light-receiving element that generates a signal in response to reception of a photon include. The SPAD element operates in a region called a Geiger mode without DC stable point in which an element is operated at a reverse voltage exceeding a breakdown voltage.

Note that, here, the SPAD element is exemplified as the light-receiving element of the pixel, but the light-receiving element is not limited to the SPAD element. That is, as the light-receiving element, in addition to the SPAD element, various elements, such as an avalanche photodiode (APD) and a silicon photomultiplier (SiPM), that operate in the Geiger mode can be used.

System Configuration Example

FIG. 16 is a block diagram schematically illustrating a system configuration of the imaging device according to the second embodiment of the present disclosure.

An imaging device 10B according to the second embodiment includes, in addition to a pixel array unit 11, an access control unit 12, a DVS reading unit 13, a DVS signal processing unit 15, a timing control unit 17, a time-stamp generation unit 18, and an output interface (I/F) 19A, a time measurement unit (time-to-digital converter: TDC) 61, a distance measurement signal processing unit 62, and an output interface 19C.

The pixel array unit 11 is provided with a DVS unit 30 and a distance measurement pixel 50 in a mixed state. As the DVS unit 30, it is possible to use a DVS unit 30 having the configuration exemplified in the first embodiment, the DVS unit 30 including a DVS pixel 31, which is an event pixel (refer to B of FIG. 2).

FIG. 17 illustrates an example of a basic pixel circuit configuration of the distance measurement pixel 50. Here, a basic configuration of one pixel is illustrated. The distance measurement pixel 50 includes, for example, a SPAD element 51 as a light-receiving element, a quenching circuit 52, and a reading circuit 53.

The SPAD element 51 has a cathode electrode connected to a first power supply, and has an anode electrode connected to a second power supply via the quenching circuit 52. A large voltage at which avalanche breakdown occurs, that is, a voltage equal to or higher than a breakdown voltage is applied from the first power supply to the cathode electrode of the SPAD element 51.

The quenching circuit 52 stops avalanche breakdown by reducing a voltage between terminals of the SPAD element 51, that is, a voltage between the cathode electrode and the anode electrode, to below a breakdown voltage of a PN diode. This operation is so-called quenching operation.

The reading circuit 53 includes, for example, a CMOS inverter circuit including a P-type MOS transistor $Q_p$ and an N-type MOS transistor $Q_n$, and detects a reaction edge of the SPAD element 51. Detection output of the reading circuit 53 is supplied to the time measurement unit (TDC) 61 illustrated in FIG. 16 as SPAD output (pixel output).

The imaging device 10B having the above-described configuration according to the second embodiment includes the DVS pixel 31 and the distance measurement pixel 50 configured to be able to acquire event information and including an SPAD element 51 that generates a signal in response to reception of a photon, and is capable of measuring a distance to a measurement target (subject).

As a measurement method for measuring the distance to the target of distance measurement, for example, it is possible to adopt a Time of Flight (ToF) method for measuring a time until light emitted from a light source unit toward the target of distance measurement is reflected by the target of distance measurement and returns. In order to adopt the ToF method, a light source unit 70 for emitting light toward the target of distance measurement is provided as an external device of the imaging device 10B according to the second embodiment. A distance measurement device (system) can be configured by a combination of the imaging device 10B according to the second embodiment and the light source unit 70.

The light source unit 70 includes, for example, a semiconductor laser, and is driven by a laser drive unit (not illustrated) to emit laser light toward the measurement target (subject). The laser light emitted from the light source unit 70 is reflected by the measurement target (subject), and the reflected light is incident on the distance measurement pixel 50 including the SPAD element 51.

The description returns to FIG. 16. On the basis of the SPAD output from the distance measurement pixel 50, the time measurement unit (TDC) 61 measures time until the laser light emitted toward the measurement target is reflected by the measurement target and returns. The time measurement is executed a plurality of times, and time is measured by detecting a peak position in a ToF histogram, the peak position being obtained by accumulating times measured the plurality of times.

As a method for the time measurement, it is possible to exemplify a method for measuring time from a timing at which the light source unit 70 emits laser light toward the measurement target to a timing at which the distance measurement pixel 50 receives reflected light from the measurement target. As another method for the time measurement, it is possible to exemplify a method for emitting pulsed light from the light source unit 70 at a predetermined cycle, detecting a cycle when the distance measurement pixel 50 receives the pulsed light, and measuring time from a phase difference between a light emission cycle and a light reception cycle.

A measurement result of the time measurement unit 61 is supplied to the distance measurement signal processing unit 62. The distance measurement signal processing unit 62 performs predetermined signal processing on the measurement result of the time measurement unit 61, and then outputs the result as distance measurement data via the output interface 19C.

[Stacked Chip Structure]

In FIG. 16, for convenience, the system configuration of the imaging device 10B according to the second embodiment is illustrated as a planar structure in which the pixel array unit 11, the access control unit 12, the DVS reading unit 13, the time measurement unit 61, the DVS signal processing unit 15, the distance measurement signal processing unit 62, the timing control unit 17, the time-stamp generation unit 18, and the like are planarly arranged. In this regard however, similarly to the imaging device 10A according to the first embodiment, the imaging device 10B according to the second embodiment has a stacked chip structure formed by stacking at least two semiconductor chips including the first-layer semiconductor chip and the second-layer semiconductor chip.

Hereinafter, a specific example of the stacked chip structure will be described. The two-layer structure is exemplified below as a stacked chip structure, but the stacked chip structure is not limited to the two-layer structure, and, similarly to a case of the imaging device 10A according to the first embodiment, a stacked chip structure with three or more layers can also be adopted.

First Specific Example

A first specific example is an example in which the SPAD element 51 is mounted on a first-layer semiconductor chip 41 serving as an upper chip, and the quenching circuit 52 is mounted on a second-layer semiconductor chip 42 serving as a lower chip. A schematic diagram of the stacked chip structure according to the first specific example is illustrated in A of FIG. 18.

As illustrated in A of FIG. 18, in the stacked chip structure according to the first specific example, the SPAD elements 51 are arranged in an array on the first-layer semiconductor chip 41 serving as the upper chip, and the quenching circuit 52, which controls quenching operation of the SPAD elements 51, and the reading circuit 53 are mounted in a one-to-one correspondence on the second-layer semiconductor chip 42 serving as the lower chip.

Second Specific Example

A second specific example is an example in which a plurality of SPAD elements 51 on the first-layer semiconductor chip 41 serving as the upper chip is treated as a unit, and the quenching circuit 52 and the time measurement unit (TDC) 61 are mounted on the second-layer semiconductor chip 42 serving as the lower chip. A schematic diagram of the stacked chip structure according to the second specific example is illustrated in B of FIG. 18.

As illustrated in B of FIG. 18, in the stacked chip structure according to the second specific example, the plurality of SPAD elements 51 treated as a unit is arranged in an array on the first-layer semiconductor chip 41 serving as the upper chip, and the quenching circuit 52, the reading circuit 53, and the time measurement unit (TDC) 61 are mounted in a one-to-one correspondence on the second-layer semiconductor chip 42 serving as the lower chip.

Configuration Examples of Pixel Array Unit

Next, configuration examples of the pixel array unit 11 in which the DVS pixels 31 and the distance measurement pixels 50 are mixed in the imaging device 10B according to the second embodiment will be described.

First Configuration Example

A first configuration example of the pixel array unit 11 is an example in which units including the DVS pixels 31 and the SPAD elements 51 are arranged in a matrix. A of FIG. 19 illustrates a pixel arrangement according to the first configuration example.

The pixel arrangement according to the first configuration example has a configuration in which, for example, pixel units X are two-dimensionally arranged in a matrix, each of the pixel units X having four DVS pixels 31 and the DVS unit 30 in units of 12 SPAD elements 51 that are arranged side by side in a square shape. With the pixel arrangement according to the first configuration example, distance measurement data and event data can be linked to each other in units of unit.

Second Configuration Example

A second configuration example is an example in which units including the DVS pixels 31 are arranged side by side in units of pixel rows. B of FIG. 19 illustrates a pixel arrangement according to the second configuration example.

The pixel arrangement according to the second configuration example has a configuration in which, for example, pixel units X are arranged side by side in units of pixel row, each of the pixel units X having four DVS pixels 31 and the DVS unit 30 in units of 12 SPAD elements 51 that are arranged side by side in a square shape. With the pixel arrangement according to the second configuration example, when accessing an SPAD element 51, it is possible to select a pixel row in which the DVS pixels 31 do not exist (that is, a pixel row without a defect).

Third Configuration Example

A third configuration example is an example in which units including the DVS pixels 31 are arranged side by side in units of pixel columns. A of FIG. 20 illustrates a pixel arrangement according to the third configuration example.

The pixel arrangement according to the third configuration example has a configuration in which, for example, pixel units X are arranged side by side in units of pixel column, each of the pixel units X having four DVS pixels 31 and the DVS unit 30 in units of 12 SPAD elements 51 that are arranged side by side in a square shape. With the pixel arrangement according to the third configuration example, as compared with a case of the pixel arrangement according to the second configuration example, amounts of event data included in the pixel rows can be uniformed, and therefore, gradation data (R/G/B data) with stable image quality can be acquired. This point is similar in a case of the pixel arrangement according to the first configuration example.

Fourth Configuration Example

A fourth configuration example is an example in which the DVS units 30 are arranged randomly. B of FIG. 20 illustrates a pixel arrangement according to the fourth configuration example.

The pixel arrangement according to the fourth configuration example has a configuration in which the DVS units 30 in units of four DVS pixels 31 are randomly arranged for example, the four DVS pixels 31 are arranged side by side in a square shape or arranged side by side in a row direction/column direction, for example. With the pixel arrangement according to the fourth configuration example, similarly to compressed sensing, high-resolution data can be restored.

DVS Unit Arrangement Examples

Next, configuration examples of the DVS unit 30 in the imaging device 10B according to the second embodiment will be described. Here, for example, provided that the DVS unit 30 includes four DVS pixels 31 as a unit, arrangement of the DVS unit 30, and connection relations between the DVS unit 30 and the DVS analog front-end (AFE) 35 in a stacked chip structure will be described.

First Arrangement Example

A first arrangement example is an example in which the DVS unit 30 includes four DVS pixels 31 arranged side by side in a square shape. A of FIG. 21 illustrates arrangement of the DVS unit 30 and a connection relation of the DVS unit with the DVS AFE 35 according to the first arrangement example. In the first arrangement example of the DVS unit 30, one DVS AFE 35 having a size of a rectangular region corresponding to the four DVS pixels 31 is associated with and electrically connected to the four DVS pixels 31 arranged side by side in a square shape.

Second Arrangement Example

A second arrangement example is an example in which the DVS unit 30 includes four DVS pixels 31 arranged side by side in a row direction. B of FIG. 21 illustrates arrangement of the DVS unit and a connection relation of the DVS unit with the DVS AFE 35 according to the second arrangement example. In the second arrangement example of the DVS unit 30, one DVS AFE 35 having a size of a horizontally-oriented rectangular region corresponding to the four DVS pixels 31 is associated with and electrically connected to the four DVS pixels 31 arranged in a horizontally-oriented rectangular shape in a row direction.

Third Arrangement Example

A third arrangement example is an example in which the DVS unit 30 includes four DVS pixels 31 arranged side by side in a column direction. A of FIG. 22 illustrates arrangement of the DVS unit and a connection relation of the DVS unit with the DVS AFE 35 according to the third arrangement example. In the third arrangement example of the DVS unit 30, one DVS AFE 35 having a size of a vertically oriented rectangular region corresponding to the four DVS pixels 31 is associated with and electrically connected to the four DVS pixels 31 arranged side by side in a vertically oriented rectangular shape in a column direction.

Fourth Arrangement Example

A fourth arrangement example is an example in which a size of the DVS unit 30 is larger than a size of the distance measurement pixel 50 including the including SPAD element 51. B of FIG. 22 illustrates arrangement of the DVS unit and a connection relation of the DVS unit with the DVS AFE 35 according to the fourth arrangement example. In the fourth arrangement example of the DVS unit 30, the size of the DVS unit 30 is larger than the size of the distance measurement pixel 50 including the SPAD element 51. For example, the size of the DVS unit 30 is as large as a size of four DVS pixels 31 arranged side by side in a square shape. Then, one DVS AFE 35 having the same size as the DVS unit 30 is associated with and electrically connected to the DVS unit 30.

Functions and Effects of Second Embodiment

As described above, the imaging device 10B according to the second embodiment has a configuration in which the DVS pixels 31 as event pixels and the distance measurement pixels 50 including the SPAD elements 51 are mixed. Therefore, with the imaging device 10B according to the second embodiment, it is possible to output not only the event data indicating event occurrence, but also distance measurement data as information of distance to the measurement target (subject). With this arrangement, for example, by detecting a moving object with the DVS pixels 31 and performing distance measurement on only the detected moving object on the basis of the distance measurement data, it is possible to achieve distance measurement with low power consumption as compared with a case where distance measurement is performed on all subjects.

Imaging Device According to Third Embodiment

An imaging device according to a third embodiment of the present disclosure has a stacked chip structure formed by stacking at least two semiconductor chips including a first-layer semiconductor chip and a second-layer semiconductor chip, in which event pixels, gradation pixels, and distance measurement pixels are mixed in a pixel array unit provided in the first-layer semiconductor chip. That is, the imaging device according to the third embodiment of the present disclosure has a configuration in which the configuration of the imaging device according to the first embodiment and the configuration of the imaging device according to the second embodiment are combined.

System Configuration Example

FIG. 23 is a block diagram schematically illustrating a system configuration of the imaging device according to the third embodiment of the present disclosure.

An imaging device 10C according to the third embodiment includes a pixel array unit 11, an access control unit 12, a DVS reading unit 13, a column signal processing unit 14, a DVS signal processing unit 15, a gradation signal processing unit 16, a timing control unit 17, a time-stamp generation unit 18, and output interfaces 19A, 19B. This is the configuration of the imaging device 10A according to the first embodiment illustrated in FIG. 1. Moreover, the imaging device 10C according to the third embodiment further includes a time measurement unit (TDC) 61, a distance measurement signal processing unit 62, and an output interface 19C. This is the configuration of the imaging device 10B according to the second embodiment illustrated in FIG. 16.

Functions and Effects of Third Embodiment

As described above, the imaging device 10C according to the third embodiment has a configuration in which the DVS pixels 31 as event pixels, the DVS pixels 31 as event pixels, and the distance measurement pixels 50 including the SPAD elements 51 are mixed. Therefore, with the imaging device 10C according to the third embodiment, it is possible to output not only the event data indicating event occurrence, but also a pixel signal (gradation data) at a gradation level according to an amount of incident light, and distance measurement data as information of distance to the measurement target (subject).

With this arrangement, it is possible to obtain the functions and effects of the first embodiment and the functions and effects of the second embodiment. Specifically, as an example, by detecting a motion of a subject with the DVS pixels 31 and performing correction by using the event data, it is possible to achieve imaging without motion blur even in a dim environment, and acquire gradation data with excellent S/N by using the gradation pixels 21. Furthermore, for example, by detecting a moving object with the DVS pixels 31 and performing distance measurement on only the detected moving object on the basis of the distance measurement data, it is possible to achieve distance measurement with low power consumption as compared with a case where distance measurement is performed on all subjects.

<Modifications>

Although the technology according to the present disclosure has been described above on the basis of the preferred embodiments, the technology according to the present disclosure is not limited to the embodiments. The configurations and structures of the imaging device according to the first embodiment in which the event pixels and the gradation pixels are mixed, the imaging device according to the second embodiment in which the event pixels and the distance measurement pixels are mixed, and the imaging device according to the third embodiment in which the event pixels, the gradation pixels, and the distance measurement pixels are mixed, which have been described in the above embodiments, are examples, and can be modified as appropriate.

Application Examples

The imaging device according to the first embodiment, the imaging device according to the second embodiment, or the imaging device according to the third embodiment can be used for various devices that sense light such as visible light, infrared light, ultraviolet light, and X-rays. Specific examples of the various devices are listed below.

A device provided to be used for viewing, such as a digital camera or a portable device with a camera function, the device taking an image.

A device provided to be used for traffic, such as an in-vehicle sensor that takes an image of front, rear, surroundings, inside, or the like of a vehicle for safe driving with automatic stop or the like, recognition of a state of a driver, or the like, a monitoring camera that monitors a traveling vehicle or road, a distance measurement sensor that measures an inter-vehicle distance, or the like.

A device provided to be used for a home appliance such as a television, a refrigerator, or an air conditioner, in order to take an image of a user gesture and perform apparatus operation according to the gesture.

A device provided to be used for medical treatment or healthcare, such as an endoscope a device that performs angiography by receiving infrared light, or the like.

A device provided to be used for security, such as a monitoring camera for crime prevention, a camera for personal authentication, or the like.

A device provided to be used for beauty, such as a skin measurement device that takes an image of skin or a microscope that takes an image of scalp.

A device provided to be used for sports, such as an action camera or wearable camera for a sports application.

A device provided to be used for agriculture, such as a camera for monitoring a condition of a field or crop.

<Configurations that Present Disclosure can Have>

Note that the present disclosure can also have the following configurations.

«A. Imaging Device»

[A-01] An imaging device including a stacked chip structure formed by stacking at least two semiconductor chips including a first-layer semiconductor chip and a second-layer semiconductor chip, in which the first-layer semiconductor chip is provided with a pixel array unit in which an event pixel that detects a phenomenon in which an amount of change in luminance of a pixel exceeds a predetermined threshold value as event occurrence and outputs an event detection signal, and a gradation pixel that outputs a pixel signal at a gradation level according to an amount of incident light are mixed, and the second-layer semiconductor chip is provided with an analog front-end unit for an event pixel that processes the event detection signal and with an analog front-end unit for a gradation pixel that processes the pixel signal, corresponding to each of the event pixel and the gradation pixel.

[A-02] The imaging device according to [A-01], in which, when a predetermined number of event pixels are defined as an event pixel unit, the event pixel units are arranged side by side in the pixel array unit according to a predetermined rule.

[A-03] The imaging device according to [A-02], in which the event pixel units are combined with a predetermined number of gradation pixels as a pixel unit, and are arranged in the pixel array unit.

[A-04] The imaging device according to [A-02], in which the event pixel units are arranged side by side in units of pixel rows in a pixel array in a matrix in the pixel array unit.

[A-05] The imaging device according to [A-02], in which the event pixel units are arranged side by side in units of pixel columns in a pixel array in a matrix in the pixel array unit.

[A-06] The imaging device according to [A-01], in which, when a predetermined number of event pixels are defined as an event pixel unit, the event pixel units are arranged side by side irregularly in the pixel array unit.

[A-07] The imaging device according to [A-02], in which the event pixels are arranged side by side in the event pixel unit according to a predetermined rule.

[A-08] The imaging device according to [A-07], in which the event pixels are arranged side by side in a square shape in the event pixel unit.

[A-09] The imaging device according to [A-07], in which the event pixels are arranged side by side in a row direction of a pixel array in a matrix in the event pixel unit.

[A-10] The imaging device according to [A-07], in which the event pixels are arranged side by side in a column direction of a pixel array in a matrix in the event pixel unit.

[A-11] The imaging device according to [A-07], in which a size of the event pixel is larger than a size of the gradation pixel.

[A-12] The imaging device according to any one of [A-01] to [A-11], in which the number of the gradation pixels is larger than the number of the event pixels.

[A-13] The imaging device according to [A-01], in which, in addition to the event pixel and the gradation pixel, a distance measurement pixel is mixed in the pixel array unit, the distance measurement pixel including a light-receiving element that receives, from a target of distance measurement, reflected light based on irradiation light from a light source unit, and generates a signal in response to reception of a photon.

[A-14] The imaging device according to [A-13], in which the second-layer semiconductor chip is provided with, corresponding to the distance measurement pixel, a quenching circuit that controls the light-receiving element.

[A-15] The imaging device according to [A-13] or [A-14], in which the light-receiving element of the distance measurement pixel includes an avalanche photodiode that operates in a Geiger mode.

[A-16] The imaging device according to [A-15], in which the light-receiving element of the distance measurement pixel includes a single-photon avalanche diode.

«B. Other Imaging Devices»

[B-01] An imaging device including a stacked chip structure formed by stacking at least two semiconductor chips including a first-layer semiconductor chip and a second-layer semiconductor chip, in which the first-layer semiconductor chip is provided with a pixel array unit in which an event pixel that detects a phenomenon in which an amount of change in luminance of a pixel exceeds a predetermined threshold value as event occurrence and outputs an event detection signal, and a distance measurement pixel including a light-receiving element that receives, from a target of distance measurement, reflected light based on irradiation light from a light source unit and generates a signal in response to reception of a photon are mixed, and the second-layer semiconductor chip is provided with an analog front-end unit for an event pixel that processes the event detection signal and with an analog front-end unit for a distance measurement pixel that processes the signal from the light-receiving element, corresponding to each of the event pixel and the distance measurement pixel.

[B-02] The imaging device according to [B-01], in which the second-layer semiconductor chip is provided with, corresponding to the distance measurement pixel, a quenching circuit that controls the light-receiving element.

[B-03] The imaging device according to [B-01] or [B-02], in which the light-receiving element of the distance measurement pixel includes an avalanche photodiode that operates in a Geiger mode.

[B-04] The imaging device according to [B-03], in which the light-receiving element of the distance measurement pixel includes a single-photon avalanche diode.

REFERENCE SIGNS LIST

10A Imaging device according to first embodiment
10B Imaging device according to second embodiment
10C Imaging device according to third embodiment
11 Pixel array unit
12 Access control unit
13 DVS control unit
14 Column signal processing unit
15 DVS signal processing unit
16 Gradation signal processing unit
17 Timing control unit
18 Time-stamp generation unit 19A, 19B Output interface (I/F)
20 Gradation circuit
21 Gradation pixel
22 Gradation memory
24 Gradation pixel unit
30 DVS unit (event pixel unit)
31 DVS pixel
32 Selector
35 DVS AFE (analog front-end)
41 First-phase semiconductor chip
42 Second-phase semiconductor chip
43 Third-phase semiconductor chip
50 Distance measurement circuit
51 SPAD element
52 Quenching circuit
53 Reading circuit
61 Time measurement unit (TDC)
62 Distance measurement signal processing unit
70 Light source unit

What is claimed is:

1. An imaging device, comprising:
a stacked chip structure formed by stacking at least two semiconductor chips including a first-layer semiconductor chip and a second-layer semiconductor chip,
wherein the first-layer semiconductor chip is provided with a pixel array unit in which an event pixel that detects a phenomenon in which an amount of change in luminance of a pixel exceeds a predetermined threshold value as event occurrence and outputs an event detection signal, and a gradation pixel that outputs a pixel signal at a gradation level according to an amount of incident light are mixed, and
the second-layer semiconductor chip is provided with an analog front-end unit for an event pixel that processes the event detection signal and with an analog front-end unit for a gradation pixel that processes the pixel signal, corresponding to each of the event pixel and the gradation pixel,
wherein four event pixels are defined as an event pixel unit,
wherein the analog front-end unit for the event pixel unit is provided under the event pixel unit and has a same shape as a shape of the event pixel unit on a one-to-one basis, and
wherein the analog front-end unit for the gradation pixel is provided under the gradation pixel and has a same shape as a shape of the gradation pixel on a one-to-one basis.

2. The imaging device according to claim 1, wherein event pixel units are arranged side by side in the pixel array unit according to a predetermined rule.

3. The imaging device according to claim 2, wherein the event pixel units are combined with a predetermined number of gradation pixels as a pixel unit, and are arranged in the pixel array unit.

4. The imaging device according to claim 2, wherein the event pixel units are arranged side by side in units of pixel rows in a pixel array in a matrix in the pixel array unit.

5. The imaging device according to claim 2, wherein the event pixel units are arranged side by side in units of pixel columns in a pixel array in a matrix in the pixel array unit.

6. The imaging device according to claim 2, wherein the event pixels are arranged side by side in the event pixel unit according to a predetermined rule.

7. The imaging device according to claim 6, wherein the event pixels are arranged side by side in a square shape in the event pixel unit.

8. The imaging device according to claim 6, wherein the event pixels are arranged side by side in a row direction of a pixel array in a matrix in the event pixel unit.

9. The imaging device according to claim 6, wherein the event pixels are arranged side by side in a column direction of a pixel array in a matrix in the event pixel unit.

10. The imaging device according to claim 6, wherein a size of the event pixel is larger than a size of the gradation pixel.

11. The imaging device according to claim 1, wherein, event pixel units are arranged side by side irregularly in the pixel array unit.

12. The imaging device according to claim 1, wherein the number of the gradation pixels is larger than the number of the event pixels.

13. The imaging device according to claim 1, wherein, in addition to the event pixel and the gradation pixel, a distance measurement pixel is mixed in the pixel array unit, the distance measurement pixel including a light-receiving element that receives, from a target of distance measurement, reflected light based on irradiation light from a light source unit, and generates a signal in response to reception of a photon.

14. The imaging device according to claim 13, wherein the second-layer semiconductor chip is provided with, corresponding to the distance measurement pixel, a quenching circuit that controls the light-receiving element.

15. The imaging device according to claim 13, wherein the light-receiving element of the distance measurement pixel includes an avalanche photodiode that operates in a Geiger mode.

16. The imaging device according to claim 15, wherein the light-receiving element of the distance measurement pixel includes a single-photon avalanche diode.

17. An imaging device, comprising:
a stacked chip structure formed by stacking at least two semiconductor chips including a first-layer semiconductor chip and a second-layer semiconductor chip,
wherein the first-layer semiconductor chip is provided with a pixel array unit in which an event pixel that detects a phenomenon in which an amount of change in luminance of a pixel exceeds a predetermined threshold value as event occurrence and outputs an event detection signal, and a distance measurement pixel including a light-receiving element that receives, from a target of distance measurement, reflected light based on irradiation light from a light source unit and generates a signal in response to reception of a photon are mixed, and
the second-layer semiconductor chip is provided with an analog front-end unit for an event pixel that processes the event detection signal and with a quenching circuit for a distance measurement pixel that processes the signal from the light-receiving element, corresponding to each of the event pixel and the distance measurement pixel,
wherein four event pixels are defined as an event pixel unit,
wherein the analog front-end unit for the event pixel unit is provided under the event pixel unit and has a same shape as a shape of the event pixel, and
wherein the quenching circuit for the distance measurement pixel is provided under the distance measurement pixel.

18. The imaging device according to claim 17, wherein the second-layer semiconductor chip is provided with, corresponding to the distance measurement pixel, the quenching circuit that controls the light-receiving element.

19. The imaging device according to claim 17, wherein the light-receiving element of the distance measurement pixel includes an avalanche photodiode that operates in a Geiger mode.

20. The imaging device according to claim 19, wherein the light-receiving element of the distance measurement pixel includes a single-photon avalanche diode.

* * * * *